US011861557B2

(12) United States Patent
Anido et al.

(10) Patent No.: US 11,861,557 B2
(45) Date of Patent: Jan. 2, 2024

(54) METHODS, SYSTEMS, AND DEVICES FOR BEVERAGE CONSUMPTION AND INVENTORY CONTROL AND TRACKING

(71) Applicant: Aware Technologies, Inc., Dover, DE (US)

(72) Inventors: Vince Anido, Carrollton, GA (US); Justin Park, Carrollton, GA (US)

(73) Assignee: Aware Technologies, Inc., Dover, DE (US)

( * ) Notice: Subject to any disclaimer, the term of this patent is extended or adjusted under 35 U.S.C. 154(b) by 0 days.

(21) Appl. No.: 17/322,024

(22) Filed: May 17, 2021

(65) Prior Publication Data

US 2021/0279674 A1 Sep. 9, 2021

Related U.S. Application Data

(63) Continuation of application No. 16/671,534, filed on Nov. 1, 2019, now Pat. No. 11,010,713.

(Continued)

(51) Int. Cl.
*G06Q 10/087* (2023.01)
*G06Q 50/12* (2012.01)

(52) U.S. Cl.
CPC . *G06Q 10/087* (2013.01); *B67D 2210/00065* (2013.01); *B67D 2210/00081* (2013.01); *B67D 2210/00091* (2013.01); *G06Q 50/12* (2013.01)

(58) Field of Classification Search
CPC ............. G06Q 10/087; G06Q 50/12; B67D 2210/00065; B67D 2210/00081; B67D 2210/00091; G01F 11/265; G01F 11/267
See application file for complete search history.

(56) References Cited

U.S. PATENT DOCUMENTS 5,044,521 A 9/1991 Peckels
5,505,349 A 4/1996 Peckels
(Continued)

FOREIGN PATENT DOCUMENTS

CN 206787976 U * 12/2017
CN 109051201 A * 12/2018 ............. B65D 23/00
(Continued)

OTHER PUBLICATIONS

International Preliminary Report on Patentability dated May 20, 2021 cited in Application No. PCT/US19/59801, 16 pgs.
(Continued)

*Primary Examiner* — A. Hunter Wilder
(74) *Attorney, Agent, or Firm* — BEKIARES ELIEZER LLP

(57) ABSTRACT

Methods, systems, and devices disclosed herein may be collectively referred to as a "platform." A platform consistent with embodiments herein may be used by individuals or companies to track an amount of liquid poured from at least one liquid container. The platform may comprise a tracking device and a computing hub in operative bi-directional communication. The device that may be configured to a liquid dispensing container such as, but not limited to, a bottle. The device may be configured to receive a liquid from the container and transfer the liquid through a chamber within the device. As the liquid is transferred through the device, a computing element and sensing component integrated within the device may be configured to track an amount of liquid dispensed through the device. A communications module may then communicate the data with the hub.

20 Claims, 9 Drawing Sheets

Related U.S. Application Data

(60) Provisional application No. 62/755,934, filed on Nov. 5, 2018.

(56) References Cited

U.S. PATENT DOCUMENTS

| | | | |
|---|---|---|---|
| 5,961,008 | A | 10/1999 | Peckels |
| 6,036,055 | A | 3/2000 | Mogadam et al. |
| 6,409,046 | B1 | 6/2002 | Peckels |
| 7,768,396 | B2 | 8/2010 | Teller |
| 8,453,878 | B2 | 6/2013 | Palmquist |
| 8,954,347 | B1 | 2/2015 | Einfalt |
| 9,327,960 | B2 | 5/2016 | Sweeney et al. |
| 9,821,997 | B2 | 11/2017 | Zapp |
| 10,909,499 | B2 | 2/2021 | Anido et al. |
| 11,010,713 | B2 | 5/2021 | Anido et al. |
| 2006/0238346 | A1 | 10/2006 | Teller |
| 2007/0214055 | A1* | 9/2007 | Temko ............ G06Q 20/203 705/22 |
| 2008/0195251 | A1 | 8/2008 | Milner |
| 2009/0114675 | A1 | 5/2009 | Kuzar et al. |
| 2010/0038378 | A1 | 2/2010 | Gabler et al. |
| 2011/0166699 | A1* | 7/2011 | Palmquist ......... B67D 3/0041 222/23 |
| 2012/0211516 | A1 | 8/2012 | Zapp et al. |
| 2014/0263424 | A1 | 9/2014 | Fortuna |
| 2014/0299634 | A1 | 10/2014 | Zapp |
| 2014/0346198 | A1* | 11/2014 | Bond ................. B67D 3/0041 222/641 |
| 2018/0201494 | A1 | 7/2018 | Chhabra |
| 2018/0265344 | A1 | 9/2018 | Keating et al. |
| 2018/0327243 | A1 | 11/2018 | Rider et al. |
| 2020/0143316 | A1 | 5/2020 | Anido et al. |
| 2020/0172387 | A1 | 6/2020 | Hershberger et al. |
| 2020/0180935 | A1* | 6/2020 | Zumtobel ............ B67D 1/00 |
| 2020/0372456 | A1 | 11/2020 | Anido et al. |

FOREIGN PATENT DOCUMENTS

| | | |
|---|---|---|
| EP | 2969904 B1 | 1/2016 |
| WO | 2017211890 A1 | 12/2017 |
| WO | 2020097035 A3 | 5/2020 |

OTHER PUBLICATIONS

International Search Report and Written Opinion dated Apr. 24, 2020 cited in Application No. PCT/US19/59801, 21 pgs.

Extended European Search Report dated Jun. 30, 2022 cited in Application No. 19883229.7, 9 pgs.

Related U.S. Appl. No. 17/940,033, filed Sep. 8, 2022; Applicant: BarMinder, Inc.

International Search Report and Written Opinion dated Dec. 23, 2022 cited in Application No. PCT/US22/42828, 10 pgs.

\* cited by examiner

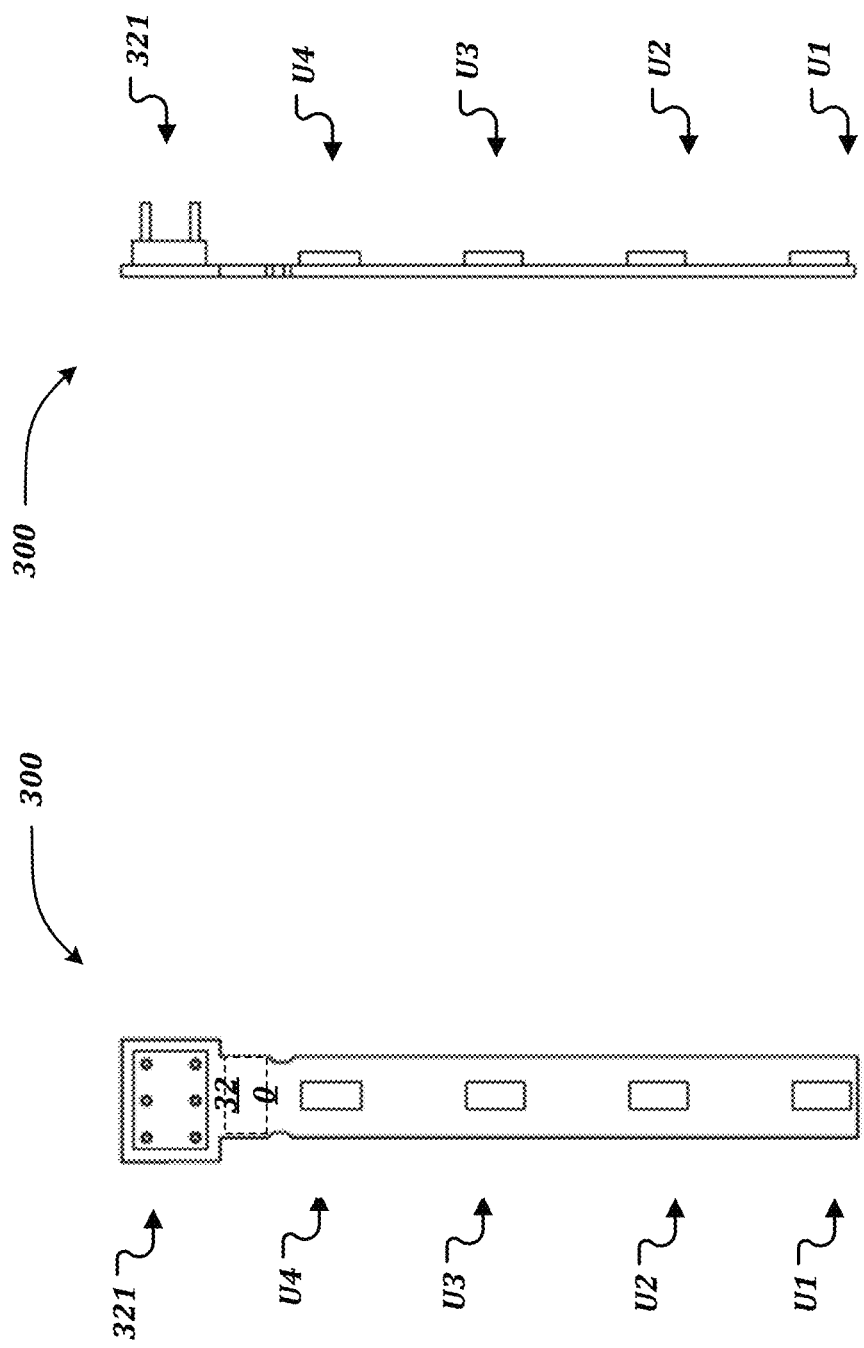

METHODS, SYSTEMS, AND DEVICES FOR BEVERAGE CONSUMPTION AND INVENTORY CONTROL AND TRACKING

RELATED APPLICATIONS

This application is a continuation of U.S. application Ser. No. 16/671,534 filed on Nov. 1, 2019, which issues on May 18, 2021 as U.S. Pat. No. 11,010,713, which claims the benefit of priority to U.S. Provisional Application No. 62/755,934 filed on Nov. 5, 2018, which are hereby incorporated by reference herein in its entirety.

It is intended that the above-referenced application may be applicable to the concepts and embodiments disclosed herein, even if such concepts and embodiments are disclosed in the referenced applications with different limitations and configurations and described using different examples and terminology.

FIELD OF DISCLOSURE

The present disclosure generally relates to tracking the amount of liquid being poured from a pour spout.

BACKGROUND

In the dispensing of liquids, particularly alcoholic beverages, it is customary to use pouring spouts mounted on the tops of bottles to facilitate the dispensing with minimum spillage. In general, these pouring spouts are free-flow pouring devices (i.e., the liquid continues to flow from the bottle so long as the bottle remains tilted. Customarily, the liquid is dispensed into a measuring vessel of fixed volume, as for example: ½ oz, ⅓ oz, 1 oz, 1½ oz, etc. and, when the desired volume is reached in the measuring vessel, the bottle is tilted to its upright non-pouring position. The contents of the measuring vessel, typically, is then emptied into a serving glass thereafter, or the like.

This procedure of pouring the liquid from the bottle to a measuring container and thence to the glass or other vessel (in which the beverage is to be served or mixed) is sometimes a tedious and time consuming process—especially in the case where many beverages are to be dispensed in a short period of time. Consequently, in the press of business, a bartender may resort to sight measuring the amount of beverage directly into the glass or mixing container, thereby eliminating the intermediate step of pouring the beverage first into a measuring container. Because of variations in the size and shape of glasses and mixing containers, the amount and size of ice cubes and the like which may be present in the container, and other factors, sight-measuring is at best a haphazard measuring procedure.

To preserve the speed of pouring by sight-measure, many pouring devices have been made which themselves combine the pouring function and the measuring function so that as the pouring operation proceeds, a fixed volume of liquid will be dispensed with each pouring operation.

However, in order to properly calculate the amount of alcohol served, compared to the amount of alcohol sales generated, an inventory must be performed, manually, and sometimes by eyesight estimation, of the approximate volume in the bottle.

Different bottles have different shapes and sizes. This drawback, along with the typically large number of bottles, presents a tedious and often inaccurate inventory that ultimately provides inexact figures for alcohol sales.

BRIEF OVERVIEW

This overview is provided to introduce a selection of concepts in a simplified form that are further described below. This overview is not intended to identify key features or essential features of the claimed subject matter. Nor is this overview intended to be used to limit the claimed subject matter's scope.

Embodiments of the present disclosure may solve many of the problems in conventional beverage consumption and inventory tracking by providing an adjustable, controlled volume liquid pouring device (herein referred to as the "device"). A device consistent with embodiments of the present disclosure may be provided to track how much liquid is dispensed through the device. Although the various embodiments herein are disclosed with the context of "liquids," one of ordinary skill in the field of the present disclosure may adapt the embodiments for any fluid type.

The device may comprise, but not be limited to, a measured pour spout which may be configured to a top portion of a bottle. For example, in some embodiments, a portion of the device may be inserted into the bottle opening. In this way, the device is configured such that the liquid passes through the device as the liquid is poured out of the bottle.

The liquid passing through the device may be tracked by a sensor configured within the device. In the various embodiments disclosed herein, the sensor may comprise, for example, a sensor stick consisting of a circuitry and at least one magnetic field sensor. The sensor may be operable with a magnetic ball bearing affecting the reading by the at least one magnetic field sensor. As the bottle, and, in turn, the device is titled, the ball bearing may displace within the device. The flux in magnetic field, as a result from the displacement, may be read by the sensor. Such interaction between the ball bearing and the sensor, may, in turn, serve as an indication as to the passing liquid from the bottle, through the device.

Still consistent with embodiments of the present disclosure, the device may be configured to collect data from the sensor readings. The data may be received by computing device operatively associated with the device. In some embodiments, a local computing device (e.g., embedded microprocessor) may be integrated within the device circuitry. Still, in other embodiments, a remote computing device (e.g., a hub) may be in remote communication with the device, via, for example, a communications module embedded within the device (e.g., Bluetooth protocol compatible).

Still consistent with embodiments of the present disclosure, the device may comprise a calibrated chamber which may be configured to limit the flow of liquid to a specific amount each time the bottle is positioned to dispense the liquid through the device. In some embodiments, the chamber may be adjusted to a desired volumetric flow rate of liquid. The adjustment of the chamber may be performed mechanically, through various components configured to affect the flow rate of liquid through the device. In some embodiments, a plurality of devices may come with a specific chamber caliber pre-set, with an inter-changeable cap for each pour amount. In turn, the specification of chamber calibration may be accounted for by a computing device associated with the device. In this way, based on the particular calibration of the device chamber, the sensor data may be analyzed to ascertain an amount of liquid poured through the device.

In yet further embodiments, a remote computing device (referred to herein as a "hub") may receive data from a plurality of devices. The hub, may, in turn, aggregate, store, communicate, analyze, or otherwise operate on the devices and its corresponding received data. In some embodiments, the hub may reside in local proximity to the devices, so as to communicate with the devices in a near-field communication protocol. While in additional embodiments, the hub may be further embodied as, for example, an allocated resource in a cloud computing environment.

Still, in some embodiments, a local computing device in near-field communication with a plurality of devices may receive device data and communicate the data to the hub. The local computing device may then receive data back from the hub. In this way, a centralized operator may control and/or monitor a plurality of devices located in a plurality of locations. Accordingly, the hub may, by way of non-limiting example, calculate an amount of liquid left in each bottle (knowing the specification of each container) by summing the total amount poured by each device, and return corresponding data or instructions back to a local computing device in operative communication with the plurality of devices.

Further still, in some embodiments, a user interface may be provided for consuming and/or acting upon the data. The interface may be provided through, for example, but not limited, a web application or a mobile device application. In some embodiments, the hub may be in further communication with third party infrastructure, such as, but not limited to, for example, cloud computing, inventory management, distribution systems, and marketing and sales platforms. In this way, conventional systems and methods for managing liquor inventory and sales may be improved upon with the methods, systems, and devices of the present disclosure.

Both the foregoing brief overview and the following detailed description provide examples and are explanatory only. Accordingly, the foregoing brief overview and the following detailed description should not be considered to be restrictive. Further, features or variations may be provided in addition to those set forth herein. For example, embodiments may be directed to various feature combinations and sub-combinations described in the detailed description.

BRIEF DESCRIPTION OF THE DRAWINGS

The accompanying drawings, which are incorporated in and constitute a part of this disclosure, illustrate various embodiments of the present disclosure. The drawings contain representations of various trademarks and copyrights owned by the Applicants. In addition, the drawings may contain other marks owned by third parties and are being used for illustrative purposes only. All rights to various trademarks and copyrights represented herein, except those belonging to their respective owners, are vested in and the property of the Applicants. The Applicants retain and reserve all rights in their trademarks and copyrights included herein, and grant permission to reproduce the material only in connection with reproduction of the granted patent and for no other purpose.

Furthermore, the drawings may contain text or captions that may explain certain embodiments of the present disclosure. This text is included for illustrative, non-limiting, explanatory purposes of certain embodiments detailed in the present disclosure. In the drawings:

FIG. 3A illustrates one example embodiment of sensing device useable with the device of FIG. 1.

FIG. 3B is a side view of the sensing device of FIG. 3A.

FIG. 4B illustrates an embodiment of a device consistent with embodiments of the present disclosure, without a cover on.

DETAILED DESCRIPTION

Figure 1:
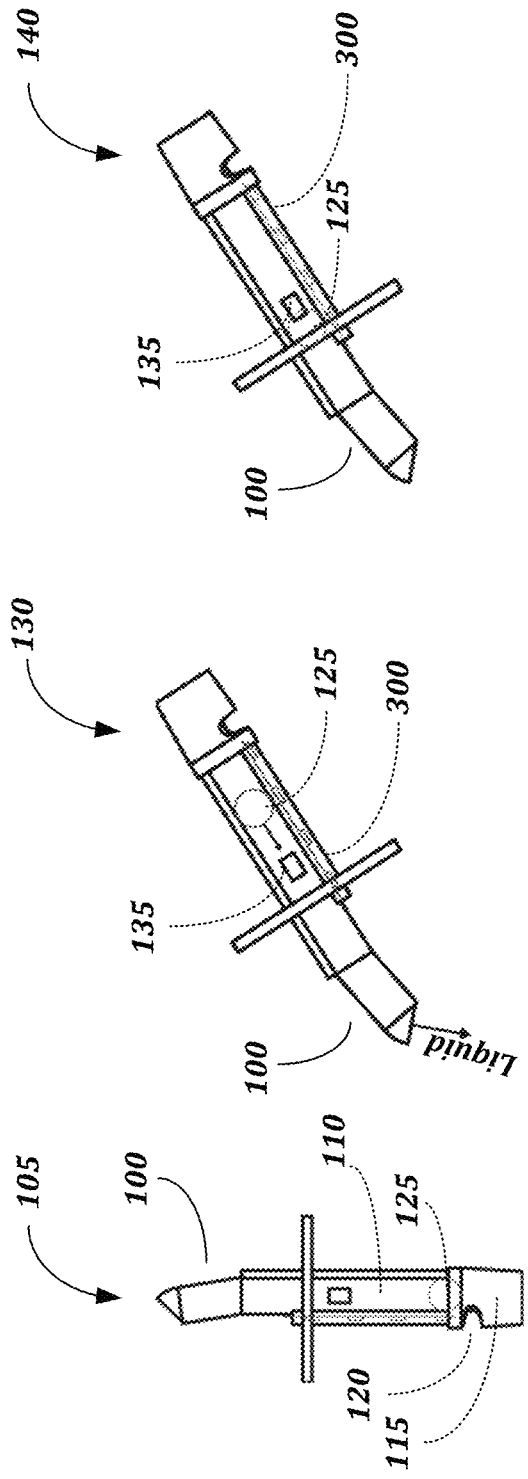
FIG. 1 illustrates one embodiments of a cycle for which the invention goes through when in use.

As a preliminary matter, it will readily be understood by one having ordinary skill in the relevant art that the present disclosure has broad utility and application. As should be understood, any embodiment may incorporate only one or a plurality of the above-disclosed aspects of the disclosure and may further incorporate only one or a plurality of the above-disclosed features. Furthermore, any embodiment discussed and identified as being "preferred" is considered to be part of a best mode contemplated for carrying out the embodiments of the present disclosure. Other embodiments also may be discussed for additional illustrative purposes in providing a full and enabling disclosure. Moreover, many embodiments, such as adaptations, variations, modifications, and equivalent arrangements, will be implicitly disclosed by the embodiments described herein and fall within the scope of the present disclosure.

Accordingly, while embodiments are described herein in detail in relation to one or more embodiments, it is to be understood that this disclosure is illustrative and exemplary of the present disclosure and are made merely for the purposes of providing a full and enabling disclosure. The detailed disclosure herein of one or more embodiments is not intended, nor is to be construed, to limit the scope of patent protection afforded in any claim of a patent issuing here from, which scope is to be defined by the claims and the equivalents thereof. It is not intended that the scope of patent protection be defined by reading into any claim a limitation found herein that does not explicitly appear in the claim itself.

Thus, for example, any sequence(s) and/or temporal order of steps of various processes or methods that are described herein are illustrative and not restrictive. Accordingly, it should be understood that, although steps of various processes or methods may be shown and described as being in a sequence or temporal order, the steps of any such processes or methods are not limited to being carried out in any particular sequence or order, absent an indication otherwise.

Indeed, the steps in such processes or methods generally may be carried out in various different sequences and orders while still falling within the scope of the present invention. Accordingly, it is intended that the scope of patent protection is to be defined by the issued claim(s) rather than the description set forth herein.

Additionally, it is important to note that each term used herein refers to that which an ordinary artisan would understand such term to mean based on the contextual use of such term herein. To the extent that the meaning of a term used herein—as understood by the ordinary artisan based on the contextual use of such term—differs in any way from any particular dictionary definition of such term, it is intended that the meaning of the term as understood by the ordinary artisan should prevail.

Regarding applicability of 35 U.S.C. § 112, ¶6, no claim element is intended to be read in accordance with this statutory provision unless the explicit phrase "means for" or "step for" is actually used in such claim element, whereupon this statutory provision is intended to apply in the interpretation of such claim element.

Furthermore, it is important to note that, as used herein, "a" and "an" each generally denotes "at least one," but does not exclude a plurality unless the contextual use dictates otherwise. When used herein to join a list of items, "or" denotes "at least one of the items," but does not exclude a plurality of items of the list. Finally, when used herein to join a list of items, "and" denotes "all of the items of the list".

The following detailed description refers to the accompanying drawings. Wherever possible, the same reference numbers are used in the drawings and the following description to refer to the same or similar elements. While many embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the appended claims. The present disclosure contains headers. It should be understood that these headers are used as references and are not to be construed as limiting upon the subjected matter disclosed under the header.

The present disclosure includes many aspects and features. Moreover, while many aspects and features relate to, and are described in, the context of beverage dispensing from a bottle, embodiments of the present disclosure are not limited to use only in this context. For example, any fluid or liquid dispensing applications may be anticipated to be within the scope of the present disclosure.

I. Overview

This brief overview is provided to introduce a selection of concepts in a simplified form that are further described below in the Detailed Description. This brief overview is not intended to identify key features or essential features of the claimed subject matter. Nor is this brief overview intended to be used to limit the claimed subject matter's scope.

Methods, systems, and devices disclosed herein may be collectively referred to as a "platform." A platform consistent with embodiments herein may be used by individuals or companies to track an amount of liquid poured from at least one liquid container. The platform may comprise a tracking device and a computing hub in operative bi-directional communication.

The device may be configured to a liquid dispensing container such as, but not limited to, a bottle. The device may be configured to receive a liquid from the container and transfer the liquid through a chamber within the device. As the liquid is transferred through the device, a computing element and sensing component integrated within the device may be configured to track an amount of liquid dispensed through the device. A communications module may then communicate the data with the hub.

Still consistent with embodiments of the present disclosure, the device may be configured to limit an amount of liquid dispensed through the device by way of a calibrated chamber which dispenses a specific amount each time the bottle inverts. In turn, the device may be configured to sense an amount of liquid poured through the device. The device may then communicate the sensor data to a computing element, either integrated within the device itself, and/or to a network computing element.

The computing element, having received the data from the device, may then calculate, for example, at least one of the following: an amount of liquid dispensed and an amount of liquid remaining in the bottle to which the device is attached. Accordingly, the device may be paired or registered with the platform, along with a specification of a liquid container type that the device is configured to. In this way, the platform may be configured to report a plurality of metrics associated with a plurality of liquid containers having a device consistent with embodiments of the present disclosure configured thereto.

Both the foregoing overview and the following detailed description provide examples and are explanatory only. Accordingly, the foregoing overview and the following detailed description should not be considered to be restrictive. Further, features or variations may be provided in addition to those set forth herein. For example, embodiments may be directed to various feature combinations and subcombinations described in the detailed description.

II. Device Design and Operation

A device consistent with embodiments of the present disclosure may be, for example, a liquid pouring spout (referred to as a "device" throughout the present disclosure) that connects to a liquid container. In some embodiments, as with conventional liquid pouring spouts, the device may comprise an adjustably controllable measuring liquid pourer for dispensing liquid in a predetermined quantity.

FIG. 1 illustrates one possible embodiment of the liquid pouring spout 100, in three configurations. In a first configuration 105, spout 100 may be in an upright position, ready to receive liquid. In a second configuration 130, spout 100 may be receiving liquid through the chamber. In a third configuration 140, spout 100 may have completed the dispensing of liquid. The following disclosure will describe spout 100, as a device 100, through the various configurations.

Consistent with embodiments of the present disclosure, device 100 may comprise a calibrated chamber 110 which may be configured to limit the flow of liquid to a specific amount each time the bottle is positioned to dispense the liquid through the device. In some embodiments, chamber 110 may be adjusted to a desired volumetric flow rate of liquid. The adjustment of chamber 110 may be performed mechanically, through various components configured to affect the flow rate of liquid through the device. In some embodiments, a plurality of devices may come with a specific chamber caliber pre-set, with an inter-changeable cap 115 for each pour amount.

Still, in further embodiments, it is anticipated that, for example, a computer-controlled actuator may be configured to dynamically and programmatically adjust a property of device 100 (e.g., an opening 120 of cap 115) so as to affect the flow rate through device 100. In this way, for example, a remote operator of the device may be enabled, via a computing device and communications module, to control the limits of liquid flow through device 100. In turn, the specification of chamber calibration may be accounted for by a computing device associated with device 100. In this way, based on the particular calibration of the device 100 (e.g., by way of chamber 110 or cap 115), the sensor data may be analyzed to ascertain an amount of liquid poured through the device.

Referring still to FIG. 1, chamber 110 within upright configuration 105 may comprise a ball bearing 125 resting at the base of camber 110, adjacent to cap 115. Cap 115 may comprise a cut-out 120 for receiving a liquid into chamber 110 from a liquid container to which device 100 may be configured. In some embodiments, cap 115 may be configured so as to be inserted into a liquid container opening (e.g., at the top of a bottle) and receive the liquid from the container. In such embodiments, and as illustrated with reference to FIGS. 4A and 4B, a stopping and sealing means 405 may be provided to ensure a secure connection to a liquid container. The stopping and sealing means 405 may comprise, but not be limited to, for example, a silicon, rubber, elastomeric, silicone, polyurethane, plastic, or cork material. Still, within upright configuration 105, ball bearing 125 may rest at the base of the chamber, thereby sealing the liquid within the container connected to device 100.

Referring back to FIG. 1, pouring configuration 130, liquid may enter device 100 through opening 135, filling chamber 110. A vacuum effect may be created with opening 120, thereby causing ball bearing 125 to float on the liquid through chamber 110, as facilitated by an air vent cut-out 120 positioned within chamber 110. To understand the operation of device 100 during pouring configuration 130, we turn to FIGS. 2-4.

Figure 2:
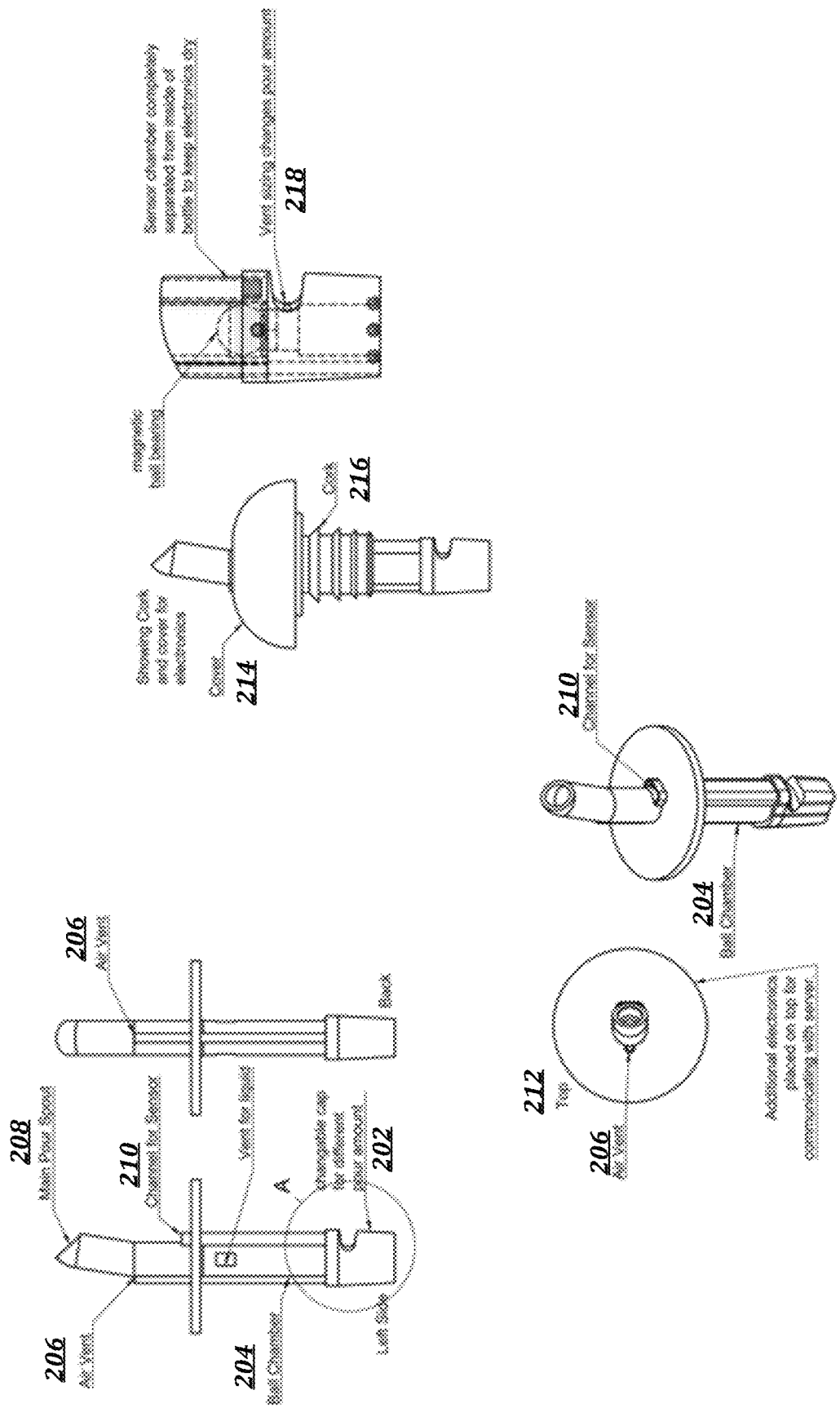
FIG. 2 illustrates the invention, displaying various perspectives and views that include, but are not limited to, cross sections, individual parts independently viewed and various angles of the embodiment.

Still consistent with embodiments of the present disclosure, and as illustrated in FIG. 2, a hollow space (herein known as a "channel for sensor") may be designed alongside chamber 110, spanning the length of chamber 110. The channels purpose may be, but is not limited to, to create a space for the sensor stick to be placed secure and flush alongside the ball chamber 110.

A magnetic sensing device comprising a magnetic sensor circuitry (hereinafter referred to as a "sensor stick") may be placed inside the channel for sensor. FIG. 3 illustrates one example embodiment of sensing device 300, and FIG. 4 illustrates how sensing device 300 may be inserted into the channel. Sensing device 300 may comprise two primary components: a circuit board of a predetermined width having at least one processor 320 thereon, the length of the circuit board being at least the span of the ball chamber 110; and a plurality of sensors U1, U2, U3, and U4. The sensing device 300 may also include a physical connector or interface 321, configured to communicate with an external processor (not illustrated) or other device. It is noted that processor 320 may be physically present on the sensing device 300, or may be a separate device (not illustrated). The circuit board may be a printed circuit board and may include printed circuitry and may be sized to be retained within the channel for sensor. There may be no limitation to a quantity of sensors used. In some embodiments, the quantity may range from one to four sensors, mounted on the circuit board and orientated, by way of non-limiting example, equidistant from each other (See FIG. 3, sensors U1-U4).

Consistent with embodiments of the present disclosure, ball bearing 125 may have magnetic properties so as to interface with sensing device 300. The magnetic field sensors on the sensing device 300 may be used to determine the magnetic ball bearing's location. In some embodiments, sensing device 300 may determine the magnetic ball bearing's location using, for example, without limitation, the hall effect. The hall effect is the production of a voltage difference across an electrical conductor, transverse to an electric current in the conductor and to an applied magnetic field perpendicular to the current. By tracking location of ball bearing 125 as a function of the pour spout's position, the amount of liquid released may be tracked by a computing device in accordance to embodiments disclosed herein. Tracking may comprise, but not be limited to, for example, calculating the displacement of ball bearing 125 within chamber 110.

In some embodiments, the sensors may be coupled with additional components, use alternative measurements (e.g., magnetic flux, electrical flux, or EM flux) to ascertain the ball bearing's location. For example, optomechanical systems and corresponding sensors may be used in conjunction with, or ingratiated with, the sensing device 300. In further embodiments, a magnetically operated mechanical switch may be used in conjunction with, or ingratiated with, the sensing device 300. In yet further embodiments, MEMS magnetic field sensors using Lorentz force may be used in conjunction with, or ingratiated with, the sensing device 300. Furthermore, although particularly described as using a magnetic field sensor or other sensor in the several preceding examples herein, capacitance sensing, limit-switch sensing, physical displacement sensing, and any other suitable form of sensing is also applicable. Accordingly, it should be understood by one of ordinary skill in the field of the present disclosure that a plurality of systems may be adapted to be in conjunction with, or integrated with, sensing device 300 to achieve the desired results.

Figure 4B:
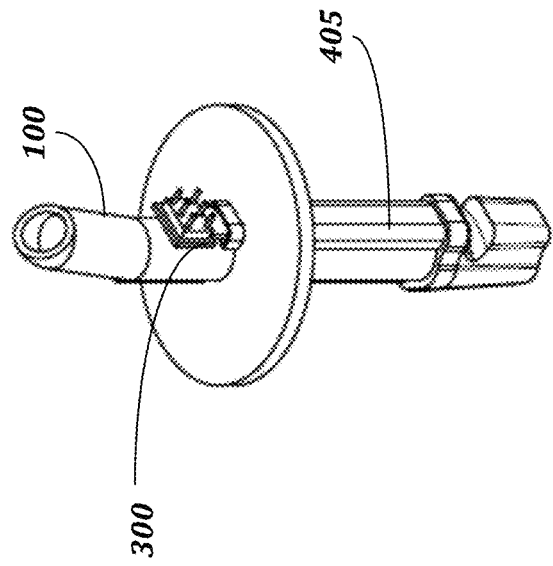
Figure 4A:
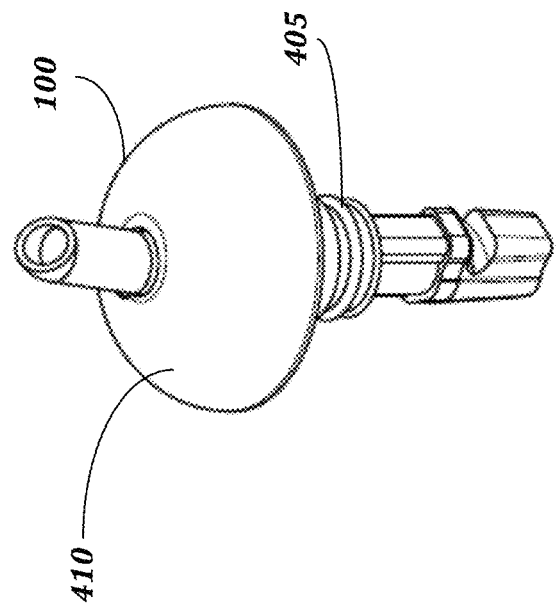
FIG. 4A illustrates an embodiment of a device consistent with embodiments of the present disclosure, having a cover on it.

Referring now to FIG. 4A and FIG. 4B, device 100 may comprise a cover 410 corresponding to the area and shape of the main pour spout and air vent 135, so as to fit flush with the main pour spout and prevent moisture from entering through cover 410. The material of cover 410 may be made from, but not limited to metal, plastic, or wood. Cover 410 may be used, but not limited to, for example, insulate the channel for sensor from outside elements such as, but not limited to, liquid, dirt, and grime.

Accordingly, referring back to FIG. 1, device 100 may allow measured liquid pours specified by a user to be administered from a bottle in discrete portions. Device 100 may be attached to the opening of a bottle containing liquid. The starting orientation, in the initial configuration 105, may be such that a base of a liquid container (e.g., the bottle) is level with the ground, with the pour spout facing upwards, perpendicular with the ground, and ball bearing 125 is at the bottom of chamber 110.

Turning towards configuration 130, device 100 may then invert (i.e., Rotated 90°-180° from original orientation) such that ball bearing 125 begins travel down the path of the ball chamber 110. The liquid in ball chamber 110 may then be expelled by the force of gravity, and force ball bearing 125 down the chamber 110. The displacement of ball bearing 125 is detected by sensing device 300 and is used, in turn, to track an amount of liquid dispensed during the pour.

Now in configuration 140, ball bearing 125 may cease travel when it reaches "top" of the ball chamber 110, as ball bearing 125 may be configured to seal a pouring hole in device 100. In some embodiments, ball bearing 125 may also cover, at least in part, air-vent 135, further affecting the liquid flow rate. In scenarios of a partial pour, ball bearing 125 may not be completely forced to the "top" of chamber 110 (e.g., device 100 is not inverted long enough for ball bearing 125 to travel the length of chamber 110 is then reverted to its initial configuration 110. Nevertheless, sensing device 300 may still measure the total displacement of ball bearing 125 within chamber 110.

In some embodiments, the measured distance may be exported to a computing device (e.g., a hub). Having each pour spout assigned to a particular spirit, the measured distance may serve as input to an algorithm configured to calculate an amount of liquid dispensed from the bottle to which device 100 is affixed.

As described above, the device 100 may include a variety of features and mechanics configured to assist in tracking inventory. For example, with reference to FIG. 2, the device may include a bottom cap 202. The bottom cap 202 includes a first opening 218 to receive a liquid from a bottle and a second opening to measurably release the received liquid into ball chamber 204. Generally, increasing the size of the first opening 218 of the bottom cap 202 decreases the predetermined amount of the liquid. Similarly, decreasing the size of the first opening 218 of the bottom cap 202 increases the predetermined amount of liquid.

The ball chamber 204 is arranged on the bottom cap 202. The ball chamber 204 includes a bottom opening in fluid communication with the second opening of the bottom cap 202. The ball chamber 204 includes a cylindrical cavity arranged to retain the ball bearing and the predetermined amount of liquid. The cylindrical cavity is also in fluid communication with the bottom opening. Finally, the ball chamber 204 also includes a top opening in fluid communication with the cylindrical cavity so that liquid can be poured through to main pour spout 208.

Air vent 206 is arranged proximate the ball chamber 204. Air vent 206 is configured to receive air from an exterior of a liquid dispensing container and direct the received air to the interior of the liquid dispensing container.

The sensor cavity 210 is arranged proximate the ball chamber 204. The sensor cavity 210 is also termed a "channel for sensor" herein, and is an elongated channel configured to retain at least one sensor. Generally, the at least one sensor can be actuated by the ball bearing as described herein. Additionally, the sensor cavity 210 is sealed to prevent the liquid from entering the sensor cavity 210 and fouling the at least one sensor.

The device 100 may also include a top 212 configured to seat onto or about a neck or top opening of a liquid dispensing container, such as a liquor or wine bottle. The top 212 may be covered by cover 214. Additional electronics, including any necessary antennas, transceivers, or other electronics may be housed beneath the cover 214. Additionally, the device 100 can include a sealing member or sealing ring 216 arranged about the ball chamber, configured to seal and/or seat within the bottle neck beneath the top 212.

Hereinafter, operation of individual inventory tracking devices 100 is presented with reference to FIGS. 5 and 6.

III. Platform Design and Operation

Figure 5:
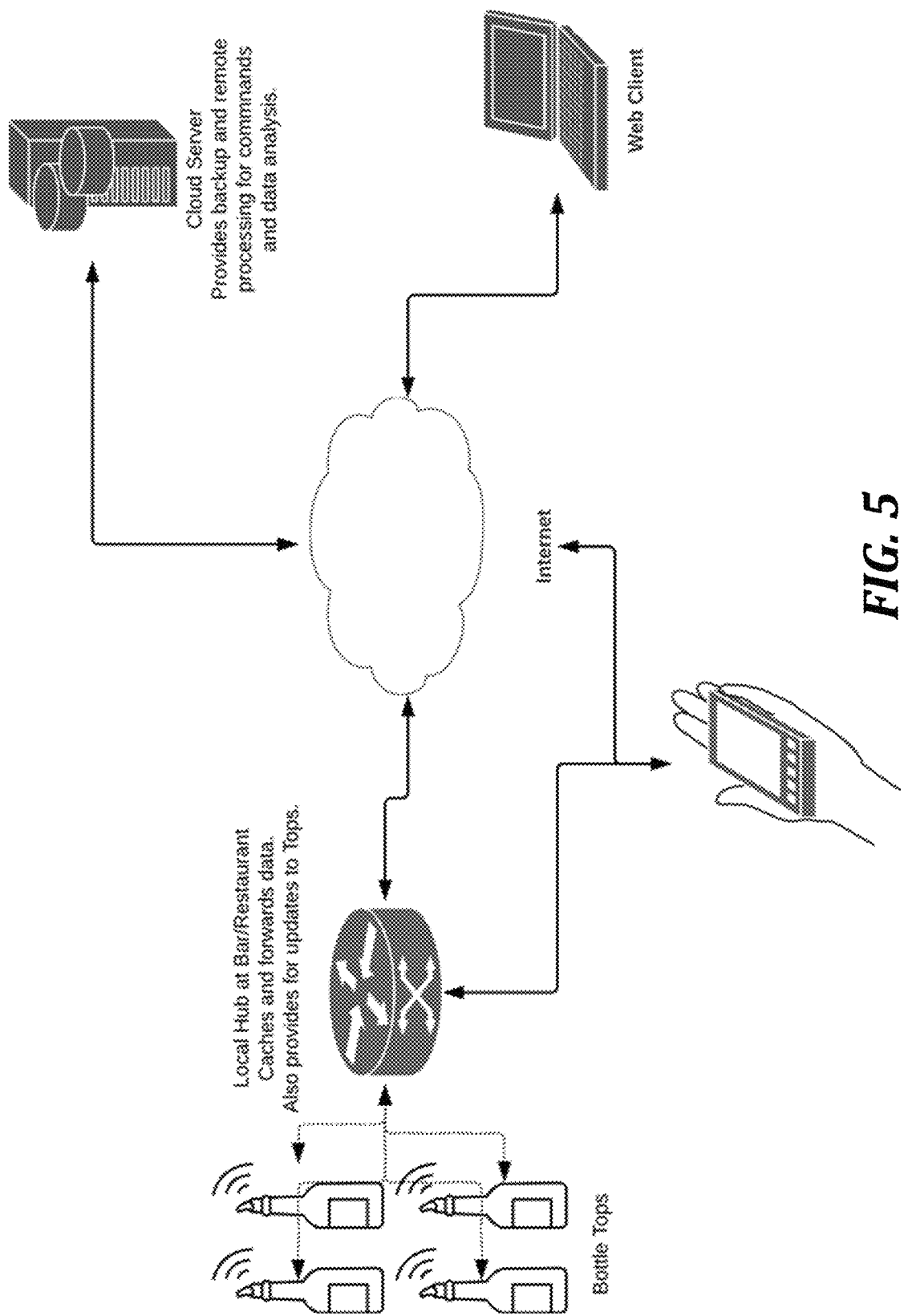
FIG. 5 illustrates an operating environment for providing a computing platform consistent with embodiments of the present disclosure.
Figure 6:
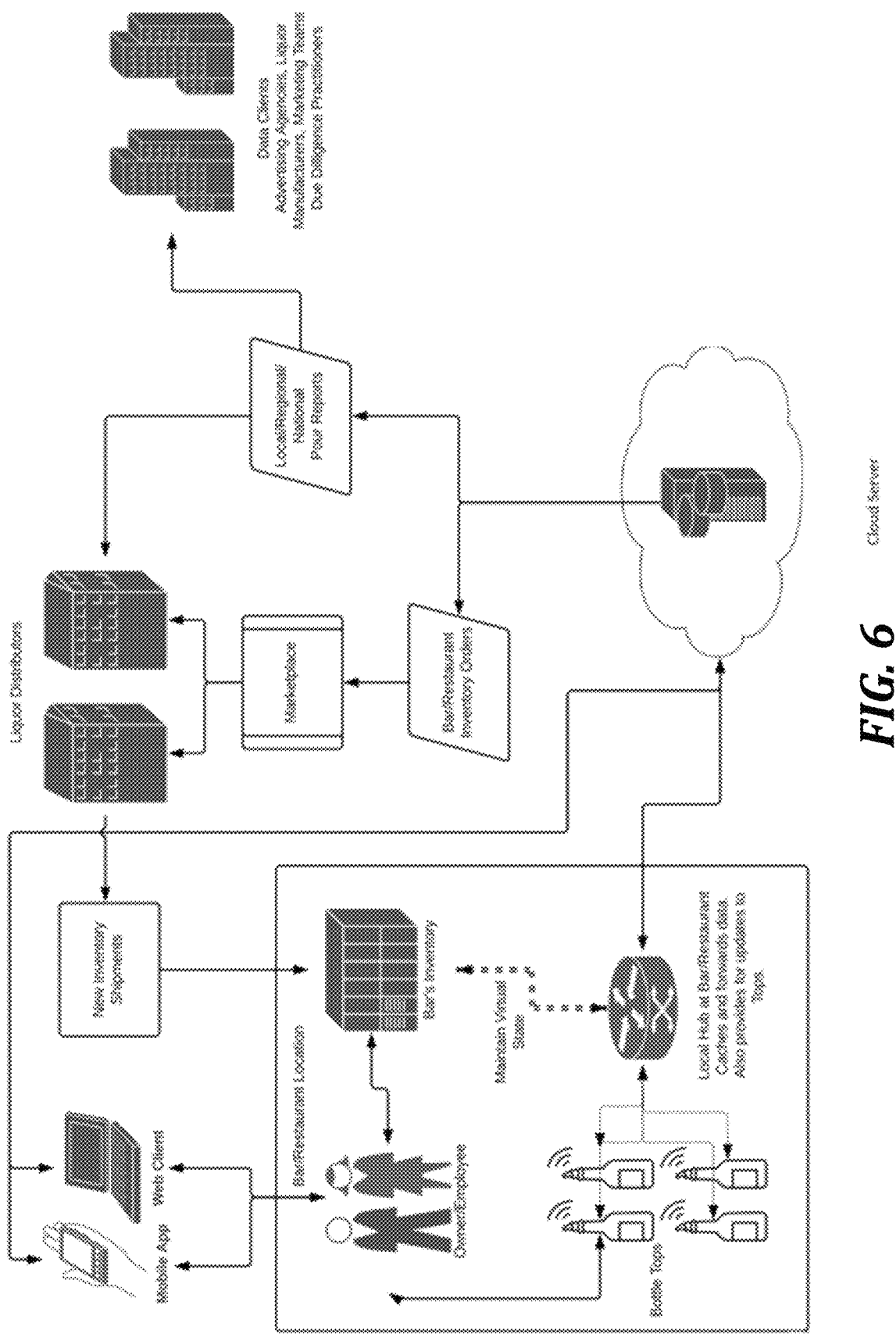
FIG. 6 Illustrates another operating environment for providing a marketplace consistent with embodiments of the present disclosure.

FIGS. 5 and 6 illustrate possible operating environments through which a platform consistent with embodiments of the present disclosure may be provided. By way of non-limiting example, the platform may be hosted on a centralized server, such as, for example, a hub or a cloud computing service. A user may access the platform through a software application. The software application may be embodied as, for example, but not be limited to, a website, a web application, a desktop application, and a mobile application compatible with a computing device FIG. 9. One possible embodiment of the software application may be provided by the BarMinder™ suite of products and services provided by BarMinder, Inc.

As will be detailed with reference to FIG. 9 below, the computing device through which the platform may be accessed may comprise, but not be limited to, for example, an integrated circuit, a desktop computer, a laptop, a tablet, mobile telecommunications device, or an Internet of Things (IOT) device.

A platform for tracking beverage consumption and inventory may be configured to operate as disclosed herein. Although the stages of operation depicted herein are disclosed in a particular order, it should be understood that the order is disclosed for illustrative purposes only. Stages may be combined, separated, reordered, and various intermediary stages may exist. Accordingly, it should be understood that the various stages may be, in various embodiments, performed in arrangements that differ from the ones illustrated. Moreover, various stages may be added or removed without altering or deterring from the fundamental scope of the depicted methods and systems disclosed herein.

Consistent with embodiments of the present disclosure, sensing device 300 may be operatively associated with a communications module (e.g., integrated near-field communications technology) to send data wirelessly to a hub. The communications module may be a part of, or separate from, the at least one processor 320. As mentioned above, a hub may be, for example, an on-premises computing device in local proximity to device 100. Each data stream may be associated with a particular device configured to a particular bottle, each programmatically registered with the platform. In this way, the platform may ascertain which device is attached to which bottle. The data streams communicated to the hub associated with a particular device may be assigned a "pour number" uniquely for the particular device. The data stream may comprise, for example, but not be limited to, a volume of any particular pour (½ oz, 1 oz, 1.5 oz etc.), and total volume poured since placed on new bottle, battery voltage, and other metrics on functionality of device (e.g., recently placed on new bottle, etc.).

Still consistent with embodiments of the present disclosure, the hub may send data back to device 100 (e.g., software updates). Such bi-directional communication may be facilitated by a communications module configured to communicate directly over a local network with, for example, a software application associated with the platform. In addition, the hub may be configured to communicate with other computing devices in a networked environment. One such computing device may be within a cloud computing environment, connected through a telecommunications channel. The cloud computing device may be configured to track a plurality of devices within a plurality of locations, and enable remote computing devices (e.g., a mobile phone) to connect thereto. In some embodiments, data collected on the cloud computing environment may be used and sold to companies such as, but not limited to, advertising agencies, liquor manufacturers, marketing teams, and due diligence practitioners.

The mobile app and web client may enable the user to interact with the data collected. The app may communicate through the internet to the cloud servers, and directly to the Hub. This facilitates easier setup and management if Internet connectivity isn't available. The mobile app may have the following data aggregated: relevant data generated by the system, inventory levels, predictions of when inventory orders need to be placed, automatic adding of needed inventory to a cart for simple ordering or the ability to enable automatic ordering at set thresholds, access to a marketplace to order new inventory, allows manual reconciliation with physical counts during auditing to bring system's count of inventory in line.

In yet further embodiments, and as illustrated in FIG. 6, a "marketplace" may provide a centralized network for communication between buyers of spirits, liquor distributors, and data clients. The marketplace may facilitate a streamlined sales process for distributors to advertise, solicit, and sell their spirits to prospective buyers. When an order of spirits is needed, they may be requested or publicly posted in the marketplace, and distributors may compete to bid and fill orders. Distributors traditionally employ large salesforces to sell through their products. The marketplace reduces the work required to place and fulfill orders and may increase distributors' margins. The marketplace may charge the distributor a set percentage fee on each order. Distributors may manage actual delivery of inventory to the physical location of the bar.

An exemplary process as shown in FIG. 6 may follow the following procedure. Although the stages of operation depicted herein are disclosed in a particular order, it should be understood that the order is disclosed for illustrative purposes only. Stages may be combined, separated, reordered, and various intermediary stages may exist. Accordingly, it should be understood that the various stages may be, in various embodiments, performed in arrangements that differ from the ones illustrated. Moreover, various stages may be added or removed without altering or deterring from the fundamental scope of the depicted methods and systems disclosed herein.

First, a plurality of devices consistent with embodiments disclosed herein may collect information from their respective bottles. Each device's data may be sent to, for example, the hub, which calculates and logs liquid container inventory. The logged inventory may be viewed from a computing device connected to the hub. Then, data from the hub is sent to, for example, a centralized server. Based on the information on the server, orders may be placed on the marketplace, or that information may be sold to third parties. As orders are placed and fulfilled in the marketplace, distributors may coordinate the shipping and distribution of the ordered products. Hereinafter, a more detailed discussion of operation of the platforms described herein is provided with reference to FIGS. 7-8.

Figure 7:
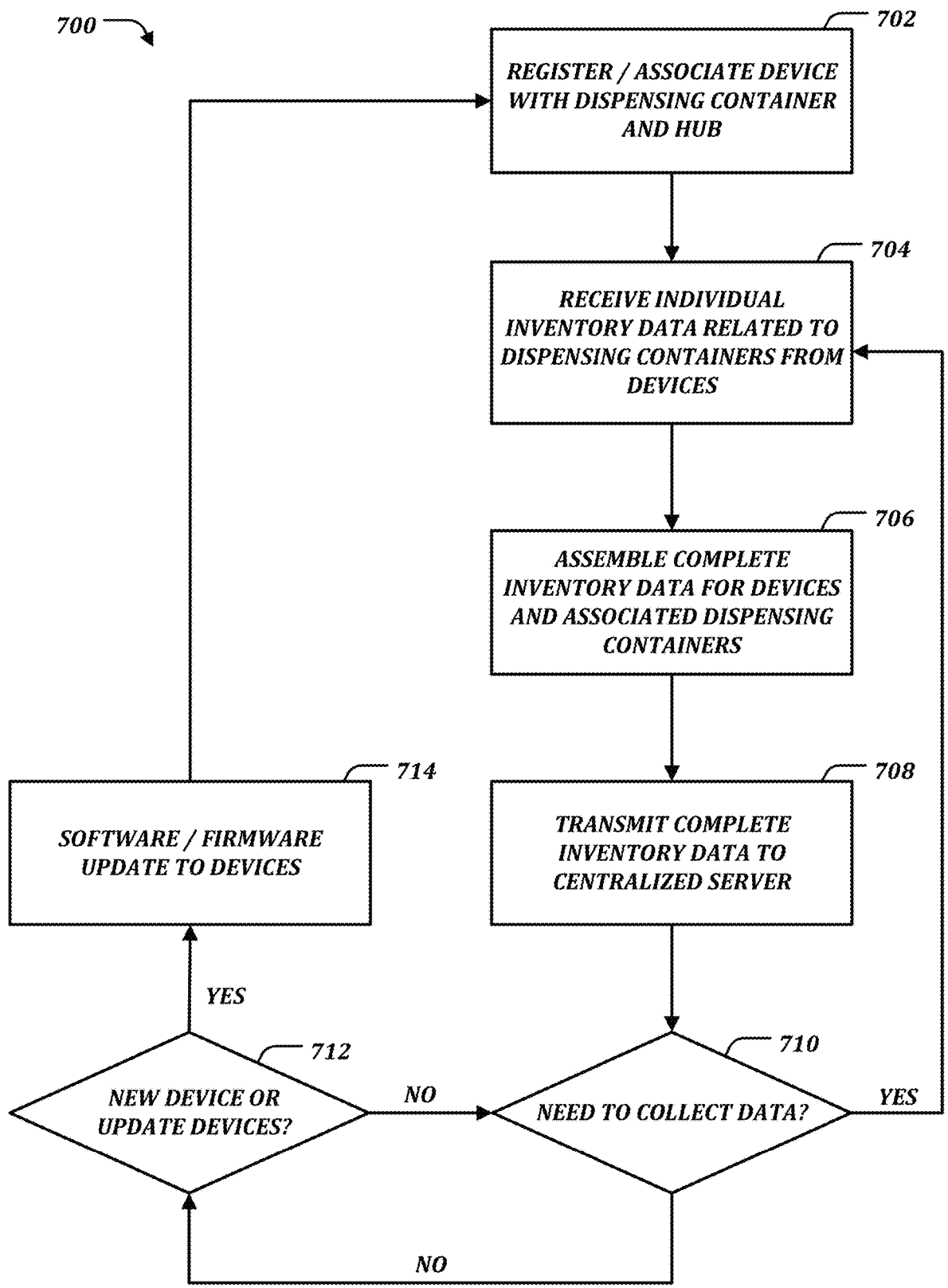
FIG. 7 is a flowchart of a method of automated inventory control of dispensed liquids consistent with embodiments of the present disclosure.

FIG. 7 is a flowchart of a method 700 of automated inventory control of dispensed liquids, in accordance with various embodiments of the present disclosure. The method 700 may include registering and/or associating a device with a particular liquid dispensing container and a hub, at block 702. Generally, registering includes assigning associated identifying data to an inventory tracking device, where the identifying data identifies a particular type of liquid dispensing container associated with the inventory tracking device.

The method 700 may further include receiving individual inventory data related to dispensing containers from the registered devices, at block 704. For example, individual inventory tracking devices 100 can transmit volumetric data of the liquid dispensing container to the hub.

The method 700 may further include assembling inventory data for the devices and associated dispensing containers responsive to the receiving, at block 706. The assembling can include aggregating data for every bottle for a customer that has an active inventory tracking device 100.

The method 700 may further includes transmitting the assembled inventory data to a centralized server or cloud server, at block 708. For example, the centralized cloud server is described with reference to FIGS. 5 and 6, above. In addition to the assembled inventory data, or in the alternative, the hub may transmit one or more purchase orders to the centralized server. For example, the one or more purchase orders may include inventory data or other suitable data to ensure an order is validly placed from the hub.

Thereafter, the method 700 may include determining a need to collect data from the registered devices, at block 710, and determining if a new device is present, if an unregistered device is within range, or if a software update is available, at block 712. Generally, the need to collect data may be based on a flow of business, a total number of pours from a device or other indicators of diminishing inventory. The need may also be based on a predetermined schedule, regular schedule, or other schedule. Software update availability may be manually pushed onto the hub or may be based on a predetermined schedule to check for updates.

If there is a need to collect data, the method 700 resumes at block 704. If there is a software update available, the method 700 includes pushing the software and/or firmware update to the registered device, at block 714. The method 700 may subsequently continue with block 702 or 704, depending upon any desired implementation of the methodology.

As described above, the method 700 includes operations configured to be performed by a hub or localized processor, and individual devices. Hereafter, method 800 is described as related to operations configured to be performed through a centralized server or cloud-based architecture.

Figure 8:
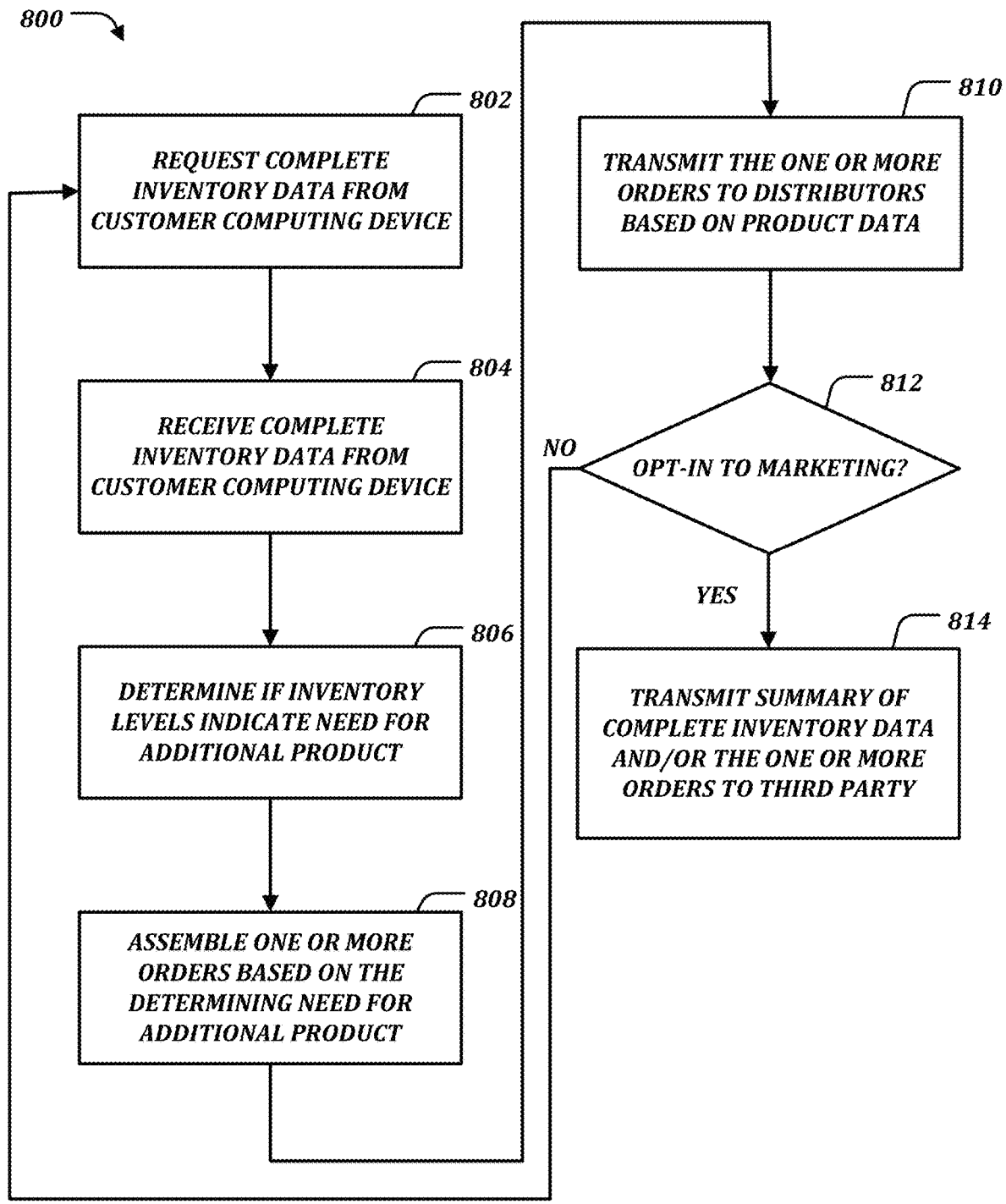
FIG. 8 is a flowchart of a method of automated inventory control of dispensed liquids consistent with embodiments of the present disclosure.

FIG. 8 is a flowchart of the method 800 of automated inventory control of dispensed liquids. The method 800 includes requesting inventory data from a customer computing device, at block 802. The inventory data may be received from a hub over a network. The inventory data may be received regularly, on a regular schedule, or may be received according to a different schedule. The inventory data may also be received based on a demand. The demand may be a demand for additional product. The demand may be based on an amount of liquid poured/served, an amount of sales, activity at a customer location, or other attributes. This network may be separate or different from the network used by the hub to communicate with the individual device 100.

The method 800 further includes receiving the requested inventory data from the customer computing device, at block 804. The inventory data may be received over the network. The inventory data may include volumetric data, sales data, and/or other suitable data.

The method 800 also includes determining if inventory levels indicate a need for additional product, at block 806. For example, the need may be based on sales volume or other attributes, including predicted holidays or large sales events. Other attributes for need can be adjusted based on any desired implementation.

The method 800 also includes assembling one or more purchase orders based on the determining the need for additional product, at block 808. The method 800 also includes transmitting the one or more orders to distributors based on product data, at block 810. The distributors may be sent purchase orders based on inventory at the distributor or availability data for products. Thus, the method 800 may also include choosing a distributor based on an attribute, such as availability of a food product or spirit.

It is noted that both the hub and centralized server may be quipped to issue purchase orders. For example, according to one aspect, the hub may issue purchase orders on behalf of a customer. According to an additional aspect, the centralized server may issue purchase orders on behalf of a customer.

The method 800 also includes determining that a customer associated with the one or more orders has opted-in to receive marketing promotions or otherwise authorized release of purchase order or inventory data, at block 812. If the customer has opted-in or otherwise agreed, the method 800 can include transmitting a summary of the inventory data and/or the one or more purchase orders to a third party, at block 814.

As described above, various methodologies associated with automated inventory control of dispensed liquids has been provided herein. The methodologies may be associated with any dispensed liquid, such as food products, liquors, wines, or other consumable liquids. In other implementations, the methodologies may be associated with a dispensed liquid such as motor oil, washing fluid, or other liquids associated with automotive maintenance. In other implementations, the methodologies may be associated with a dispensed liquid such as a hair product, nail polish, cream or lotion, or other liquids associated with a beauty salon. In still further implementations, the methodologies may be associated with any liquid to be dispensed that is measurable in volume through sensing displacement, as described herein.

IV. Computing Device Architecture

Portions of the invention may be embodied as, for example, but not be limited to, a website, a web application, a desktop application, backend application, and a mobile application compatible with a computing device 900. Any portion of the disclosed systems may include a computing device 900, including the sensor stick 300, hub, cloud server, centralized server, or any other portion of the invention. The computing device 900 may comprise, but not be limited to the following:

- Mobile computing device, such as, but is not limited to, a laptop, a tablet, a smartphone, a drone, a wearable, an embedded device, a handheld device, an Arduino, an industrial device, or a remotely operable recording device;
- A supercomputer, an exa-scale supercomputer, a mainframe, or a quantum computer;
- A minicomputer, wherein the minicomputer computing device comprises, but is not limited to, an IBM AS400/iSeries/System I, A DEC VAX/PDP, a HP3000, a Honeywell-Bull DPS, a Texas Instruments TI-990, or a Wang Laboratories VS Series;
- A microcomputer, wherein the microcomputer computing device comprises, but is not limited to, a server, wherein a server may be rack mounted, a workstation, an industrial device, a raspberry pi, a desktop, or an embedded device.

Embodiments herein may be hosted on a centralized server or a cloud computing service. Although methods 700 and 800 have been described to be performed by a computing device 900, it should be understood that, in some embodiments, different operations may be performed by a plurality of the computing devices 900 in operative communication at least one network.

Embodiments of the present disclosure may comprise a system having a central processing unit (CPU) 920, a bus 930, a memory unit 940, a power supply unit (PSU) 950, and one or more Input/Output (I/O) units. The CPU 920 coupled to the memory unit 940 and the plurality of I/O units 960 via the bus 930, all of which are powered by the PSU 950. It should be understood that, in some embodiments, each disclosed unit may actually be a plurality of such units for the purposes of redundancy, high availability, and/or performance. The combination of the presently disclosed units is configured to perform the stages any method disclosed herein.

Figure 9:
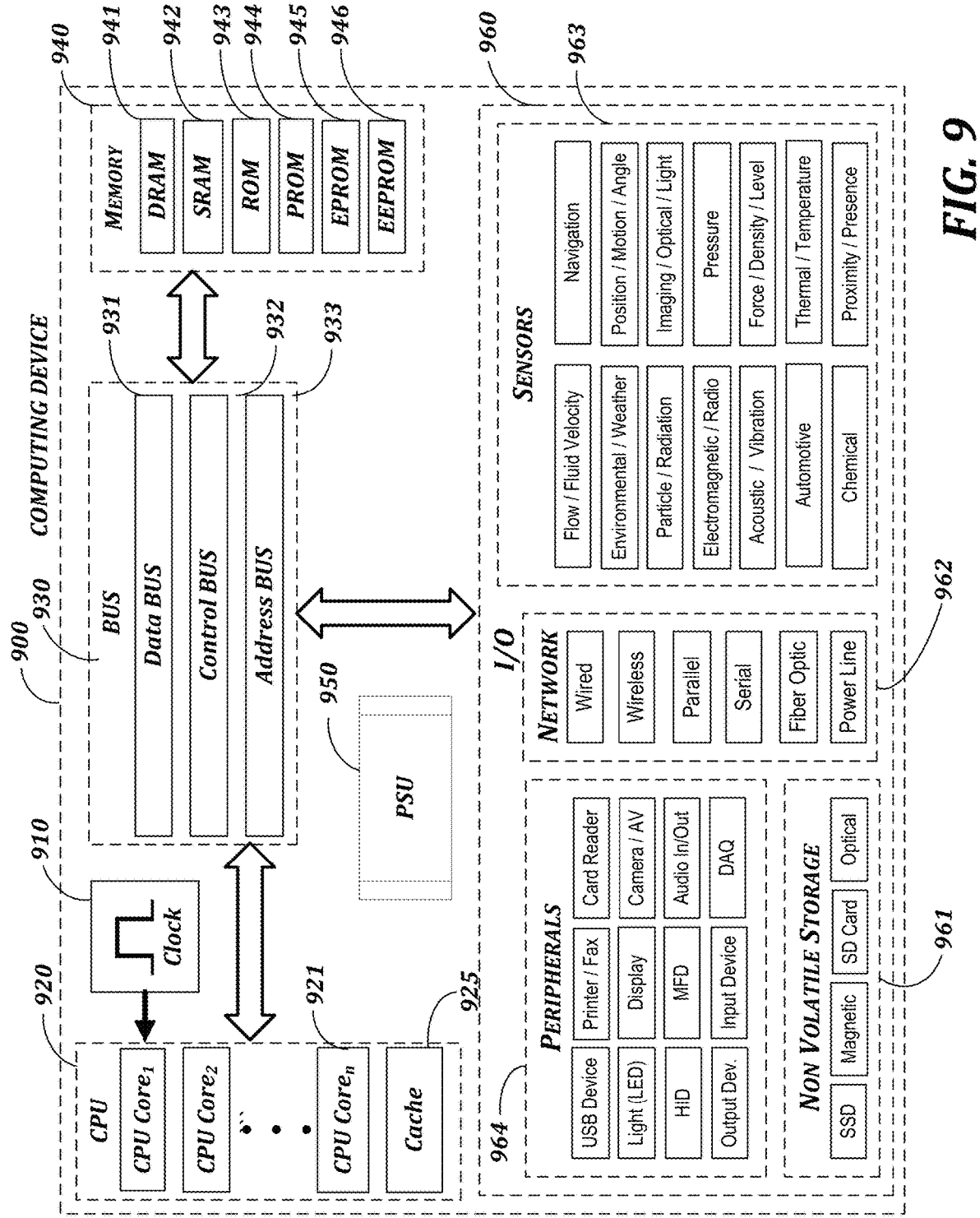
FIG. 9 illustrates a computing device consistent with embodiments of the present disclosure.

FIG. 9 is a block diagram of a system including computing device 900. Consistent with an embodiment of the disclosure, the aforementioned CPU 920, the bus 930, the memory unit 940, a PSU 950, and the plurality of I/O units 960 may be implemented in a computing device, such as computing device 900 of FIG. 9. Any suitable combination of hardware, software, or firmware may be used to implement the aforementioned units. For example, the CPU 920, the bus 930, and the memory unit 940 may be implemented with computing device 900 or any of other computing devices 900, in combination with computing device 900. The aforementioned system, device, and components are examples and other systems, devices, and components may comprise the aforementioned CPU 920, the bus 930, the memory unit 940, consistent with embodiments of the disclosure.

At least one computing device 900 may be embodied as any of the computing elements illustrated in all of the attached figures, including sensor stick 300, processor 320, local hub, cloud server, web client, or any other element described herein. A computing device 900 does not need to be electronic, nor even have a CPU 920, nor bus 930, nor memory unit 940. The definition of the computing device 900 to a person having ordinary skill in the art is "A device that computes, especially a programmable [usually] electronic machine that performs high-speed mathematical or logical operations or that assembles, stores, correlates, or otherwise processes information." Any device which processes information qualifies as a computing device 900, especially if the processing is purposeful.

With reference to FIG. 9, a system consistent with an embodiment of the disclosure may include a computing device, such as computing device 900. In a basic configuration, computing device 900 may include at least one clock module 910, at least one CPU 920, at least one bus 930, and at least one memory unit 940, at least one PSU 950, and at least one I/O 960 module, wherein I/O module may be comprised of, but not limited to a non-volatile storage sub-module 961, a communication sub-module 962, a sensors sub-module 963, and a peripherals sub-module 964.

A system consistent with an embodiment of the disclosure the computing device 900 may include the clock module 910 may be known to a person having ordinary skill in the art as a clock generator, which produces clock signals. Clock signal is a particular type of signal that oscillates between a high and a low state and is used like a metronome to coordinate actions of digital circuits. Most integrated circuits (ICs) of sufficient complexity use a clock signal in order to synchronize different parts of the circuit, cycling at a rate slower than the worst-case internal propagation delays. The preeminent example of the aforementioned integrated circuit is the CPU 920, the central component of modern computers, which relies on a clock. The only exceptions are asynchronous circuits such as asynchronous CPUs. The clock 910 can comprise a plurality of embodiments, such as, but not limited to, single-phase clock which transmits all clock signals on effectively 1 wire, two-phase clock which distributes clock signals on two wires, each with non-overlapping pulses, and four-phase clock which distributes clock signals on 4 wires.

Many computing devices 900 use a "clock multiplier" which multiplies a lower frequency external clock to the appropriate clock rate of the CPU 920. This allows the CPU 920 to operate at a much higher frequency than the rest of the computer, which affords performance gains in situations where the CPU 920 does not need to wait on an external factor (like memory 940 or input/output 960). Some embodiments of the clock 910 may include dynamic frequency change, where, the time between clock edges can vary widely from one edge to the next and back again.

A system consistent with an embodiment of the disclosure the computing device 900 may include the CPU unit 920 comprising at least one CPU Core 921. A plurality of CPU cores 921 may comprise identical the CPU cores 921, such as, but not limited to, homogeneous multi-core systems. It is also possible for the plurality of CPU cores 921 to comprise different the CPU cores 921, such as, but not limited to, heterogeneous multi-core systems, big.LITTLE systems and some AMD accelerated processing units (APU). The CPU unit 920 reads and executes program instructions which may be used across many application domains, for example, but not limited to, general purpose computing, embedded computing, network computing, digital signal processing (DSP), and graphics processing (GPU). The CPU unit 920 may run multiple instructions on separate CPU cores 921 at the same time. The CPU unit 920 may be integrated into at least one of a single integrated circuit die and multiple dies in a single chip package. The single integrated circuit die and multiple dies in a single chip package may contain a plurality of other aspects of the computing device 900, for example, but not limited to, the clock 910, the CPU 920, the bus 930, the memory 940, and I/O 960.

The CPU unit 920 may contain cache 922 such as, but not limited to, a level 1 cache, level 2 cache, level 3 cache or combination thereof. The aforementioned cache 922 may or may not be shared amongst a plurality of CPU cores 921. The cache 922 sharing comprises at least one of message passing and inter-core communication methods may be used for the at least one CPU Core 921 to communicate with the cache 922. The inter-core communication methods may comprise, but not limited to, bus, ring, two-dimensional mesh, and crossbar. The aforementioned CPU unit 920 may employ symmetric multiprocessing (SMP) design.

The plurality of the aforementioned CPU cores 921 may comprise soft microprocessor cores on a single field programmable gate array (FPGA), such as semiconductor intellectual property cores (IP Core). The plurality of CPU cores 921 architecture may be based on at least one of, but not limited to, Complex instruction set computing (CISC), Zero instruction set computing (ZISC), and Reduced instruction set computing (RISC). At least one of the performance-enhancing methods may be employed by the plurality of the CPU cores 921, for example, but not limited to Instruction-level parallelism (ILP) such as, but not limited to, super-scalar pipelining, and Thread-level parallelism (TLP).

Consistent with the embodiments of the present disclosure, the aforementioned computing device 900 may employ a communication system that transfers data between components inside the aforementioned computing device 900, and/or the plurality of computing devices 900. The aforementioned communication system will be known to a person having ordinary skill in the art as a bus 930. The bus 930 may embody internal and/or external plurality of hardware and software components, for example, but not limited to a wire, optical fiber, communication protocols, and any physical arrangement that provides the same logical function as a parallel electrical bus. The bus 930 may comprise at least one of, but not limited to a parallel bus, wherein the parallel bus carry data words in parallel on multiple wires, and a serial bus, wherein the serial bus carry data in bit-serial form. The bus 930 may embody a plurality of topologies, for example, but not limited to, a multidrop/electrical parallel topology, a daisy chain topology, and a connected by switched hubs, such as USB bus. The bus 930 may comprise a plurality of embodiments, for example, but not limited to:

Internal data bus (data bus) 931/Memory bus
Control bus 932
Address bus 933
System Management Bus (SMBus)
Front-Side-Bus (FSB)
External Bus Interface (EBI)
Local bus
Expansion bus
Lightning bus
Controller Area Network (CAN bus)
Camera Link
ExpressCard
Advanced Technology management Attachment (ATA), including embodiments and derivatives such as, but not limited to, Integrated Drive Electronics (IDE)/Enhanced IDE (EIDE), ATA Packet Interface (ATAPI), Ultra-Direct Memory Access (UDMA), Ultra ATA (UATA)/Parallel ATA (PATA)/Serial ATA (SATA), CompactFlash (CF) interface, Consumer Electronics ATA (CE-ATA)/Fiber Attached Technology Adapted (FATA), Advanced Host Controller Interface (AHCI), SATA Express (SATAe)/External SATA (eSATA), including the powered embodiment eSATAp/Mini-SATA (mSATA), and Next Generation Form Factor (NGFF)/M.2.
Small Computer System Interface (SCSI)/Serial Attached SCSI (SAS)
HyperTransport
InfiniBand
RapidIO
Mobile Industry Processor Interface (MIPI)
Coherent Processor Interface (CAPI)
Plug-n-play
1-Wire
Peripheral Component Interconnect (PCI), including embodiments such as, but not limited to, Accelerated Graphics Port (AGP), Peripheral Component Interconnect eXtended (PCI-X), Peripheral Component Interconnect Express (PCI-e) (e.g., PCI Express Mini Card, PCI Express M.2 [Mini PCIe v2], PCI Express External Cabling [ePCIe], and PCI Express OCuLink [Optical Copper{Cu} Link]), Express Card, AdvancedTCA, AMC, Universal 10, Thunderbolt/Mini DisplayPort, Mobile PCIe (M-PCIe), U.2, and Non-Volatile Memory Express (NVMe)/Non-Volatile Memory Host Controller Interface Specification (NVMHCIS).
Industry Standard Architecture (ISA), including embodiments such as, but not limited to Extended ISA (EISA), PC/XT-bus/PC/AT-bus/PC/104 bus (e.g., PC/104-Plus, PCI/104-Express, PCI/104, and PCI-104), and Low Pin Count (LPC).
Music Instrument Digital Interface (MIDI)
Universal Serial Bus (USB), including embodiments such as, but not limited to, Media Transfer Protocol (MTP)/Mobile High-Definition Link (MHL), Device Firmware Upgrade (DFU), wireless USB, InterChip USB, IEEE 1394 Interface/Firewire, Thunderbolt, and eXtensible Host Controller Interface (xHCI).

Consistent with the embodiments of the present disclosure, the aforementioned computing device 900 may employ hardware integrated circuits that store information for immediate use in the computing device 900, know to the person having ordinary skill in the art as primary storage or memory 940. The memory 940 operates at high speed, distinguishing it from the non-volatile storage sub-module 961, which may be referred to as secondary or tertiary storage, which provides slow-to-access information but offers higher capacities at lower cost. The contents contained in memory 940, may be transferred to secondary storage via techniques such as, but not limited to, virtual memory and swap. The memory 940 may be associated with addressable semiconductor memory, such as integrated circuits consisting of silicon-based transistors, used for example as primary storage but also other purposes in the computing device 900. The memory 940 may comprise a plurality of embodiments, such as, but not limited to volatile memory, non-volatile memory, and semi-volatile memory. It should be understood by a person having ordinary skill in the art that the ensuing are non-limiting examples of the aforementioned memory:

- Volatile memory which requires power to maintain stored information, for example, but not limited to, Dynamic Random-Access Memory (DRAM) 941, Static Random-Access Memory (SRAM) 942, CPU Cache memory 925, Advanced Random-Access Memory (A-RAM), and other types of primary storage such as Random-Access Memory (RAM).
- Non-volatile memory which can retain stored information even after power is removed, for example, but not limited to, Read-Only Memory (ROM) 943, Programmable ROM (PROM) 944, Erasable PROM (EPROM) 945, Electrically Erasable PROM (EEPROM) 946 (e.g., flash memory and Electrically Alterable PROM [EAPROM]), Mask ROM (MROM), One Time Programmable (OTP) ROM/Write Once Read Many (WORM), Ferroelectric RAM (FeRAM), Parallel Random-Access Machine (PRAM), Split-Transfer Torque RAM (STT-RAM), Silicon Oxime Nitride Oxide Silicon (SONOS), Resistive RAM (RRAM), Nano RAM (NRAM), 3D XPoint, Domain-Wall Memory (DWM), and millipede memory.
- Semi-volatile memory which may have some limited non-volatile duration after power is removed but loses data after said duration has passed. Semi-volatile memory provides high performance, durability, and other valuable characteristics typically associated with volatile memory, while providing some benefits of true non-volatile memory. The semi-volatile memory may comprise volatile and non-volatile memory and/or volatile memory with battery to provide power after power is removed. The semi-volatile memory may comprise, but not limited to spin-transfer torque RAM (STT-RAM).

Consistent with the embodiments of the present disclosure, the aforementioned computing device 900 may employ the communication system between an information processing system, such as the computing device 900, and the outside world, for example, but not limited to, human, environment, and another computing device 900. The aforementioned communication system will be known to a person having ordinary skill in the art as I/O 960. The I/O module 960 regulates a plurality of inputs and outputs with regard to the computing device 900, wherein the inputs are a plurality of signals and data received by the computing device 900, and the outputs are the plurality of signals and data sent from the computing device 900. The I/O module 960 interfaces a plurality of hardware, such as, but not limited to, non-volatile storage 961, communication devices 962, sensors 963, and peripherals 964. The plurality of hardware is used by the at least one of, but not limited to, human, environment, and another computing device 900 to communicate with the present computing device 900. The I/O module 960 may comprise a plurality of forms, for example, but not limited to channel I/O, port mapped I/O, asynchronous I/O, and Direct Memory Access (DMA).

Consistent with the embodiments of the present disclosure, the aforementioned computing device 900 may employ the non-volatile storage sub-module 961, which may be referred to by a person having ordinary skill in the art as one of secondary storage, external memory, tertiary storage, off-line storage, and auxiliary storage. The non-volatile storage sub-module 961 may not be accessed directly by the CPU 920 without using intermediate area in the memory 940. The non-volatile storage sub-module 961 does not lose data when power is removed and may be two orders of magnitude less costly than storage used in memory module, at the expense of speed and latency. The non-volatile storage sub-module 961 may comprise a plurality of forms, such as, but not limited to, Direct Attached Storage (DAS), Network Attached Storage (NAS), Storage Area Network (SAN), nearline storage, Massive Array of Idle Disks (MAID), Redundant Array of Independent Disks (RAID), device mirroring, off-line storage, and robotic storage. The non-volatile storage sub-module (961) may comprise a plurality of embodiments, such as, but not limited to:

- Optical storage, for example, but not limited to, Compact Disk (CD) (CD-ROM/CD-R/CD-RW), Digital Versatile Disk (DVD) (DVD-ROM/DVD-R/DVD+R/DVD-RW/DVD+RW/DVD±RW/DVD+R DL/DVD-RAM/HD-DVD), Blu-ray Disk (BD) (BD-ROM/BD-R/BD-RE/BD-R DL/BD-RE DL), and Ultra-Density Optical (UDO).
- Semiconductor storage, for example, but not limited to, flash memory, such as, but not limited to, USB flash drive, Memory card, Subscriber Identity Module (SIM) card, Secure Digital (SD) card, Smart Card, CompactFlash (CF) card, Solid-State Drive (SSD) and memristor.
- Magnetic storage such as, but not limited to, Hard Disk Drive (HDD), tape drive, carousel memory, and Card Random-Access Memory (CRAM).
- Phase-change memory
- Holographic data storage such as Holographic Versatile Disk (HVD).
- Molecular Memory
- Deoxyribonucleic Acid (DNA) digital data storage Consistent with the embodiments of the present disclosure, the aforementioned computing device 900 may employ the communication sub-module 962 as a subset of the I/O 960, which may be referred to by a person having ordinary skill in the art as at least one of, but not limited to, computer network, data network, and network. The network allows computing devices 900 to exchange data using connections, which may be known to a person having ordinary skill in the art as data links, between network nodes. The nodes comprise network computer devices 900 that originate, route, and terminate data. The nodes are identified by network addresses and can include a plurality of hosts consistent with the embodiments of a computing device 900. The aforementioned embodiments include, but not limited to personal computers, phones, servers, drones, and networking devices such as, but not limited to, hubs, switches, routers, modems, and firewalls.

Two nodes can be said are networked together, when one computing device 900 is able to exchange information with the other computing device 900, whether or not they have a direct connection with each other. The communication sub-module 962 supports a plurality of applications and services, such as, but not limited to World Wide Web (WWW), digital video and audio, shared use of application and storage computing devices 900, printers/scanners/fax machines, email/online chat/instant messaging, remote control, distributed computing, etc. The network may comprise a plurality of transmission mediums, such as, but not limited to conductive wire, fiber optics, and wireless. The network may comprise a plurality of communications protocols to organize network traffic, wherein application-specific communications protocols are layered, may be known to a person having ordinary skill in the art as carried as payload, over other more general communications protocols. The plurality of communications protocols may comprise, but not limited to, IEEE 802, ethernet, Wireless LAN (WLAN/Wi-Fi), Internet Protocol (IP) suite (e.g., TCP/IP, UDP, Internet Protocol version 4 [IPv4], and Internet Protocol version 6 [IPv6]), Synchronous Optical Networking (SONET)/Synchronous Digital Hierarchy (SDH), Asynchronous Transfer Mode (ATM), and cellular standards (e.g., Global System for Mobile Communications [GSM], General Packet Radio Service [GPRS], Code-Division Multiple Access [CDMA], and Integrated Digital Enhanced Network [IDEN]).

The communication sub-module 962 may comprise a plurality of size, topology, traffic control mechanism and organizational intent. The communication sub-module 962 may comprise a plurality of embodiments, such as, but not limited to:
  Wired communications, such as, but not limited to, coaxial cable, phone lines, twisted pair cables (ethernet), and InfiniBand.
  Wireless communications, such as, but not limited to, communications satellites, cellular systems, radio frequency/spread spectrum technologies, IEEE 802.11 Wi-Fi, Bluetooth, NFC, free-space optical communications, terrestrial microwave, and Infrared (IR) communications. Wherein cellular systems embody technologies such as, but not limited to, 3G, 4G (such as WiMax and LTE), and 5G (short and long wavelength).
  Parallel communications, such as, but not limited to, LPT ports.
  Serial communications, such as, but not limited to, RS-232 and USB.
  Fiber Optic communications, such as, but not limited to, Single-mode optical fiber (SMF) and Multi-mode optical fiber (MMF).
  Power Line communications The aforementioned network may comprise a plurality of layouts, such as, but not limited to, bus network such as ethernet, star network such as Wi-Fi, ring network, mesh network, fully connected network, and tree network. The network can be characterized by its physical capacity or its organizational purpose. Use of the network, including user authorization and access rights, differ accordingly. The characterization may include, but not limited to nanoscale network, Personal Area Network (PAN), Local Area Network (LAN), Home Area Network (HAN), Storage Area Network (SAN), Campus Area Network (CAN), backbone network, Metropolitan Area Network (MAN), Wide Area Network (WAN), enterprise private network, Virtual Private Network (VPN), and Global Area Network (GAN).

Consistent with the embodiments of the present disclosure, the aforementioned computing device 900 may employ the sensors sub-module 963 as a subset of the I/O 960. The sensors sub-module 963 comprises at least one of the devices, modules, and subsystems whose purpose is to detect events or changes in its environment and send the information to the computing device 900. Sensors are sensitive to the measured property, are not sensitive to any property not measured, but may be encountered in its application, and do not significantly influence the measured property. The sensors sub-module 963 may comprise a plurality of digital devices and analog devices, wherein if an analog device is used, an Analog to Digital (A-to-D) converter must be employed to interface the said device with the computing device 900. The sensors may be subject to a plurality of deviations that limit sensor accuracy. The sensors sub-module 963 may comprise a plurality of embodiments, such as, but not limited to, chemical sensors, automotive sensors, acoustic/sound/vibration sensors, electric current/electric potential/magnetic/radio sensors, environmental/weather/moisture/humidity sensors, flow/fluid velocity sensors, ionizing radiation/particle sensors, navigation sensors, position/angle/displacement/distance/speed/acceleration sensors, imaging/optical/light sensors, pressure sensors, force/density/level sensors, thermal/temperature sensors, and proximity/presence sensors. It should be understood by a person having ordinary skill in the art that the ensuing are non-limiting examples of the aforementioned sensors:
  Chemical sensors, such as, but not limited to, breathalyzer, carbon dioxide sensor, carbon monoxide/smoke detector, catalytic bead sensor, chemical field-effect transistor, chemiresistor, electrochemical gas sensor, electronic nose, electrolyte-insulator-semiconductor sensor, energy-dispersive X-ray spectroscopy, fluorescent chloride sensors, holographic sensor, hydrocarbon dew point analyzer, hydrogen sensor, hydrogen sulfide sensor, infrared point sensor, ion-selective electrode, nondispersive infrared sensor, microwave chemistry sensor, nitrogen oxide sensor, olfactometer, optode, oxygen sensor, ozone monitor, pellistor, pH glass electrode, potentiometric sensor, redox electrode, zinc oxide nanorod sensor, and biosensors (such as nanosensors).
  Automotive sensors, such as, but not limited to, air flow meter/mass airflow sensor, air-fuel ratio meter, AFR sensor, blind spot monitor, engine coolant/exhaust gas/cylinder head/transmission fluid temperature sensor, hall effect sensor, wheel/automatic transmission/turbine/vehicle speed sensor, airbag sensors, brake fluid/engine crankcase/fuel/oil/tire pressure sensor, camshaft/crankshaft/throttle position sensor, fuel/oil level sensor, knock sensor, light sensor, MAP sensor, oxygen sensor (O2), parking sensor, radar sensor, torque sensor, variable reluctance sensor, and water-in-fuel sensor.
  Acoustic, sound and vibration sensors, such as, but not limited to, microphone, lace sensor (guitar pickup), seismometer, sound locator, geophone, and hydrophone.
  Electric current, electric potential, magnetic, and radio sensors, such as, but not limited to, current sensor, Daly detector, electroscope, electron multiplier, faraday cup, galvanometer, hall effect sensor, hall probe, magnetic anomaly detector, magnetometer, magnetoresistance, MEMS magnetic field sensor, metal detector, planar hall sensor, radio direction finder, and voltage detector.

Environmental, weather, moisture, and humidity sensors, such as, but not limited to, actinometer, air pollution sensor, bedwetting alarm, ceilometer, dew warning, electrochemical gas sensor, fish counter, frequency domain sensor, gas detector, hook gauge evaporimeter, humistor, hygrometer, leaf sensor, lysimeter, pyranometer, pyrgeometer, psychrometer, rain gauge, rain sensor, seismometers, SNOTEL, snow gauge, soil moisture sensor, stream gauge, and tide gauge.

Flow and fluid velocity sensors, such as, but not limited to, air flow meter, anemometer, flow sensor, gas meter, mass flow sensor, and water meter.

Ionizing radiation and particle sensors, such as, but not limited to, cloud chamber, Geiger counter, Geiger-Muller tube, ionization chamber, neutron detection, proportional counter, scintillation counter, semiconductor detector, and thermoluminescent dosimeter.

Navigation sensors, such as, but not limited to, air speed indicator, altimeter, attitude indicator, depth gauge, fluxgate compass, gyroscope, inertial navigation system, inertial reference unit, magnetic compass, MHD sensor, ring laser gyroscope, turn coordinator, variometer, vibrating structure gyroscope, and yaw rate sensor.

Position, angle, displacement, distance, speed, and acceleration sensors, such as, but not limited to, accelerometer, displacement sensor, flex sensor, free fall sensor, gravimeter, impact sensor, laser rangefinder, LIDAR, odometer, photoelectric sensor, position sensor such as, but not limited to, GPS or Glonass, angular rate sensor, shock detector, ultrasonic sensor, tilt sensor, tachometer, ultra-wideband radar, variable reluctance sensor, and velocity receiver.

Imaging, optical and light sensors, such as, but not limited to, CMOS sensor, colorimeter, contact image sensor, electro-optical sensor, infra-red sensor, kinetic inductance detector, LED as light sensor, light-addressable potentiometric sensor, Nichols radiometer, fiber-optic sensors, optical position sensor, thermopile laser sensor, photodetector, photodiode, photomultiplier tubes, phototransistor, photoelectric sensor, photoionization detector, photomultiplier, photoresistor, photoswitch, phototube, scintillometer, Shack-Hartmann, single-photon avalanche diode, superconducting nanowire single-photon detector, transition edge sensor, visible light photon counter, and wavefront sensor.

Pressure sensors, such as, but not limited to, barograph, barometer, boost gauge, bourdon gauge, hot filament ionization gauge, ionization gauge, McLeod gauge, Oscillating U-tube, permanent downhole gauge, piezometer, Pirani gauge, pressure sensor, pressure gauge, tactile sensor, and time pressure gauge.

Force, Density, and Level sensors, such as, but not limited to, bhangmeter, hydrometer, force gauge or force sensor, level sensor, load cell, magnetic level or nuclear density sensor or strain gauge, piezocapacitive pressure sensor, piezoelectric sensor, torque sensor, and viscometer.

Thermal and temperature sensors, such as, but not limited to, bolometer, bimetallic strip, calorimeter, exhaust gas temperature gauge, flame detection/pyrometer, Gardon gauge, Golay cell, heat flux sensor, microbolometer, microwave radiometer, net radiometer, infrared/quartz/ resistance thermometer, silicon bandgap temperature sensor, thermistor, and thermocouple.

Proximity and presence sensors, such as, but not limited to, alarm sensor, doppler radar, motion detector, occupancy sensor, proximity sensor, passive infrared sensor, reed switch, stud finder, triangulation sensor, touch switch, and wired glove.

Consistent with the embodiments of the present disclosure, the aforementioned computing device 900 may employ the peripherals sub-module 962 as a subset of the I/O 960. The peripheral sub-module 964 comprises ancillary devices uses to put information into and get information out of the computing device 900. There are 3 categories of devices comprising the peripheral sub-module 964, which exist based on their relationship with the computing device 900, input devices, output devices, and input/output devices. Input devices send at least one of data and instructions to the computing device 900. Input devices can be categorized based on, but not limited to:

Modality of input, such as, but not limited to, mechanical motion, audio, visual, and tactile.

Whether the input is discrete, such as but not limited to, pressing a key, or continuous such as, but not limited to position of a mouse.

The number of degrees of freedom involved, such as, but not limited to, two-dimensional mice vs three-dimensional mice used for Computer-Aided Design (CAD) applications.

Output devices provide output from the computing device 900. Output devices convert electronically generated information into a form that can be presented to humans. Input/output devices perform that perform both input and output functions. It should be understood by a person having ordinary skill in the art that the ensuing are non-limiting embodiments of the aforementioned peripheral sub-module 964:

Input Devices

Human Interface Devices (HID), such as, but not limited to, pointing device (e.g., mouse, touchpad, joystick, touchscreen, game controller/gamepad, remote, light pen, light gun, Wii remote, jog dial, shuttle, and knob), keyboard, graphics tablet, digital pen, gesture recognition devices, magnetic ink character recognition, Sip-and-Puff (SNP) device, and Language Acquisition Device (LAD).

High degree of freedom devices, that require up to six degrees of freedom such as, but not limited to, camera gimbals, Cave Automatic Virtual Environment (CAVE), and virtual reality systems.

Video Input devices are used to digitize images or video from the outside world into the computing device 900. The information can be stored in a multitude of formats depending on the user's requirement. Examples of types of video input devices include, but not limited to, digital camera, digital camcorder, portable media player, webcam, Microsoft Kinect, image scanner, fingerprint scanner, barcode reader, 3D scanner, laser rangefinder, eye gaze tracker, computed tomography, magnetic resonance imaging, positron emission tomography, medical ultrasonography, TV tuner, and iris scanner.

Audio input devices are used to capture sound. In some cases, an audio output device can be used as an input device, in order to capture produced sound. Audio input devices allow a user to send audio signals to the computing device 900 for at least one of processing, recording, and carrying out commands. Devices such as microphones allow users to speak to the computer in order to record a voice message or navigate software. Aside from recording, audio input devices are also used with speech recognition software. Examples of types of audio input devices include, but not limited to, microphone, Musical Instrumental Digital Interface (MIDI) devices such as, but not limited to a keyboard, and headset.

Data AcQuisition (DAQ) devices covert at least one of analog signals and physical parameters to digital values for processing by the computing device 900. Examples of DAQ devices may include, but not limited to, Analog to Digital Converter (ADC), data logger, signal conditioning circuitry, multiplexer, and Time to Digital Converter (TDC).

Output Devices may further comprise, but not be limited to:

Display devices, which convert electrical information into visual form, such as, but not limited to, monitor, TV, projector, and Computer Output Microfilm (COM). Display devices can use a plurality of underlying technologies, such as, but not limited to, Cathode-Ray Tube (CRT), Thin-Film Transistor (TFT), Liquid Crystal Display (LCD), Organic Light-Emitting Diode (OLED), MicroLED, E Ink Display (ePaper) and Refreshable Braille Display (Braille Terminal).

Printers, such as, but not limited to, inkjet printers, laser printers, 3D printers, solid ink printers and plotters.

Audio and Video (AV) devices, such as, but not limited to, speakers, headphones, amplifiers and lights, which include lamps, strobes, DJ lighting, stage lighting, architectural lighting, special effect lighting, and lasers.

Other devices such as Digital to Analog Converter (DAC).

Input/Output Devices may further comprise, but not be limited to, touchscreens, networking device (e.g., devices disclosed in network 962 sub-module), data storage device (non-volatile storage 961), facsimile (FAX), and graphics/sound cards.

All rights including copyrights in the code included herein are vested in and the property of the Applicant. The Applicant retains and reserves all rights in the code included herein, and grants permission to reproduce the material only in connection with reproduction of the granted patent and for no other purpose.

V. Aspects of this Disclosure

As described in detail herein, the present disclosure has several aspects, which include, but are not limited to the following:

Aspect 1 includes a device configured to dispense a predetermined amount of liquid, comprising: a bottom cap, the bottom cap having a first opening to receive a liquid and a second opening to measurably release the received liquid; a ball chamber arranged on the bottom cap, the ball chamber having a bottom opening in fluid communication with the second opening of the bottom cap, the ball chamber having a cylindrical cavity arranged to retain a ball bearing and the predetermined amount of liquid, the cylindrical cavity being in fluid communication with the bottom opening, the ball chamber further having a top opening in fluid communication with the cylindrical cavity; a sensor cavity arranged proximate the ball chamber, the sensor cavity configured to retain at least one sensor actuated by the ball bearing and sealed to prevent the liquid from entering the sensor cavity; and a pour spout arranged on the ball chamber, the pour spout being in fluid communication with the top opening of the ball chamber and configured to pour the predetermined amount of liquid.

Aspect 2 includes the device of any preceding aspect, wherein the first opening of the bottom cap is sized to receive the predetermined amount of the liquid.

Aspect 3 includes the device of any preceding aspect, wherein increasing the size of the first opening of the bottom cap decreases the predetermined amount of the liquid.

Aspect 4 includes the device of any preceding aspect, wherein decreasing the size of the first opening of the bottom cap increases the predetermined amount of the liquid.

Aspect 5 includes the device of any preceding aspect, further comprising an air vent disposed proximate the ball chamber, the air vent configured to receive air from an exterior of a liquid dispensing container and direct the received air into the interior of the liquid dispensing container.

Aspect 6 includes the device of any preceding aspect, further comprising a top configured to seat onto a liquid dispensing container.

Aspect 7 includes the device of any preceding aspect, further comprising a sensor stick disposed in the sensor cavity.

Aspect 8 includes the device of any preceding aspect, wherein the sensor stick comprises at least one magnetic sensor configured to detect placement of the ball bearing within the ball chamber.

Aspect 9 includes the device of any preceding aspect, wherein the sensor stick comprises a printed circuit board having printed circuitry thereon and being sized to be retained within the sensor cavity.

Aspect 10 includes the device of any preceding aspect, wherein the sensor stick further comprises at least one processor in operative communication with the printed circuitry.

Aspect 11 includes the device of any preceding aspect, wherein the at least one processor is configured to transmit individual inventory data to a hub device over a wireless communication protocol, and wherein the at least one processor is further configured to receive computer-readable instructions over the wireless communication protocol.

Aspect 12 includes the device of any preceding aspect, further comprising a top configured to seat onto a liquid dispensing container and a cover arranged on the top, the cover being sized to house circuitry and at least one antenna.

Aspect 13 includes the device of any preceding aspect, wherein the top and cover are formed of plastic.

Aspect 14 includes the device of any preceding aspect, further comprising a sealing ring arranged about the ball chamber, the sealing ring arranged to seat and seal within the neck of a liquid dispensing container.

Aspect 15 includes the device of any preceding aspect, wherein the sealing ring is formed of at least one of the following: rubber, cork, and plastic.

Aspect 16 includes a method of automated inventory control of dispensed liquids, the method comprising: receiving inventory data from a customer computing device, the customer computing device being in operative communication with a plurality of inventory tracking devices, each inventory tracking device of the plurality of inventory tracking devices being configured to receive and dispense a predetermined amount of liquid from a liquid dispensing container, and each of the plurality of inventory tracking devices configured to transmit individual inventory data of the associated liquid dispensing container; determining that inventory levels from the inventory data indicate a need for additional product; and assembling at least one purchase order based on determining that the inventory levels from the inventory data indicate the need for additional product.

Aspect 17 includes the method of any preceding aspect, further comprising requesting the inventory data from the customer computing device.

Aspect 18 includes the method of any preceding aspect, wherein receiving the inventory data comprises receiving the inventory data at a scheduled time.

Aspect 19 includes the method of any preceding aspect, wherein receiving the inventory data comprises calculating the inventory data at a hub.

Aspect 20 includes the method of any preceding aspect, wherein receiving the inventory data comprises receiving the inventory data based on demand for additional product.

Aspect 21 includes the method of any preceding aspect, further comprising determining the demand for additional product is based on activity related to pouring liquid from one or more of the plurality of inventory tracking devices.

Aspect 22 includes the method of any preceding aspect, further comprising: transmitting the at least one purchase order to a distributor.

Aspect 23 includes the method of any preceding aspect, further comprising selecting the distributor based on an available inventory for filling the purchase order.

Aspect 24 includes the method of any preceding aspect, wherein the at least one purchase order is a plurality of purchase orders, and the method further comprising: transmitting the plurality of purchase orders to a plurality of distributors.

Aspect 25 includes the method of any preceding aspect, further comprises choosing the plurality of distributors based on available inventory for filling each purchase order of the plurality of purchase orders.

Aspect 26 includes the method of any preceding aspect, further comprising determining if the customer has agreed to share inventory data with third parties.

Aspect 27 includes the method of any preceding aspect, wherein responsive to determining that the customer has agreed to share inventory data with third parties the method comprises: transmitting a summary of the at least one purchase order to an authorized third party.

Aspect 28 includes the method of any preceding aspect, wherein responsive to determining that the customer has agreed to share inventory data with third parties the method comprises: transmitting a summary of the inventory data to an authorized third party.

Aspect 29 includes the method of any preceding aspect, wherein each inventory tracking device of the plurality of inventory tracking devices includes a pour spout for dispensing the predetermined amount of liquid and at least one sensor for detecting the dispensing of the predetermined amount of liquid.

Aspect 30 includes the method of any preceding aspect, wherein each inventory tracking device of the plurality of inventory tracking devices comprises: a bottom cap, the bottom cap having a first opening to receive a liquid and a second opening to measurably release the received liquid; a ball chamber arranged on the bottom cap, the ball chamber having a bottom opening in fluid communication with the second opening of the bottom cap, the ball chamber having a cylindrical cavity arranged to retain a ball bearing and the predetermined amount of liquid, the cylindrical cavity being in fluid communication with the bottom opening, the ball chamber further having a top opening in fluid communication with the cylindrical cavity; a sensor cavity arranged proximate the ball chamber, the sensor cavity configured to retain at least one sensor actuated by the ball bearing and sealed to prevent the liquid from entering the sensor cavity; and a pour spout arranged on the ball chamber, the pour spout being in fluid communication with the top opening of the ball chamber and configured to pour the predetermined amount of liquid.

Aspect 31 includes a method of automated inventory control of dispensed liquids, the method comprising: receiving individual inventory data from a plurality of inventory tracking devices, each inventory tracking device of the plurality of inventory tracking devices being configured to receive and dispense a predetermined amount of liquid from a liquid dispensing container, and each of the plurality of inventory tracking devices configured to transmit individual inventory data of the associated liquid dispensing container; and assembling inventory data for all liquid dispensing containers associated with an inventory tracking device, the inventory data including a volumetric measurement of predicted liquid retained in each liquid dispensing container.

Aspect 32 includes the method of any preceding aspect, further comprising registering individual inventory devices to be associated with individual liquid dispensing containers.

Aspect 33 includes the method of any preceding aspect, wherein registering comprises assigning associated identifying data to an inventory tracking device, the identifying data identifying a particular type of liquid dispensing container associated with the inventory tracking device.

Aspect 34 includes the method of any preceding aspect, further comprising transmitting the assembled inventory data to a centralized server.

Aspect 35 includes the method of any preceding aspect, further comprising transmitting the assembled inventory data to a mobile device.

Aspect 36 includes the method of any preceding aspect, further comprising transmitting the assembled inventory data to a consumer computing apparatus, the consumer computing apparatus configured to display a graphical user interface with a graphical representation of at least a portion of the assembled inventory data.

Aspect 37 includes the method of any preceding aspect, further comprising determining a need to collect inventory data.

Aspect 38 includes the method of any preceding aspect, further comprising receiving updated individual inventory data based on the determined need.

Aspect 39 includes the method of any preceding aspect, further comprising receiving individual inventory data from inventory tracking devices that are active.

Aspect 40 includes the method of any preceding aspect, further comprising determining a need to update software on at least one inventory tracking device.

Aspect 41 includes the method of any preceding aspect, further comprising pushing computer readable instructions to the at least one inventory tracking device based on the determined need.

Aspect 42 includes the method of any preceding aspect, further comprising receiving the computer readable instructions from a centralized server.

Aspect 43 includes the method of any preceding aspect, further comprising determining that an unregistered inventory tracking device is within range of detection.

Aspect 44 includes the method of any preceding aspect, further comprising registering the unregistered inventory tracking device.

Aspect 45 includes the method of any preceding aspect, wherein each inventory tracking device of the plurality of inventory tracking devices comprises: a bottom cap, the bottom cap having a first opening to receive a liquid and a second opening to measurably release the received liquid; a ball chamber arranged on the bottom cap, the ball chamber having a bottom opening in fluid communication with the second opening of the bottom cap, the ball chamber having a cylindrical cavity arranged to retain a ball bearing and the predetermined amount of liquid, the cylindrical cavity being in fluid communication with the bottom opening, the ball chamber further having a top opening in fluid communication with the cylindrical cavity; a sensor cavity arranged proximate the ball chamber, the sensor cavity configured to retain at least one sensor actuated by the ball bearing and sealed to prevent the liquid from entering the sensor cavity; and a pour spout arranged on the ball chamber, the pour spout being in fluid communication with the top opening of the ball chamber and configured to pour the predetermined amount of liquid.

Aspect 46 includes an inventory tracking device, comprising: a bottom cap, the bottom cap having a first opening to receive a liquid and a second opening to measurably release the received liquid; a ball chamber arranged on the bottom cap, the ball chamber having a bottom opening in fluid communication with the second opening of the bottom cap, the ball chamber having a cylindrical cavity arranged to retain a ball bearing and the predetermined amount of liquid, the cylindrical cavity being in fluid communication with the bottom opening, the ball chamber further having a top opening in fluid communication with the cylindrical cavity; a sensor cavity arranged proximate the ball chamber, the sensor cavity configured to retain at least one sensor actuated by the ball bearing and sealed to prevent the liquid from entering the sensor cavity; and a printed circuit board disposed within the sensor cavity, the printed circuit board having the at least one sensor and a processor configured to perform operations, the operations comprising: determining that the at least one sensor has been actuated in response to movement of a liquid dispensing container; and transmitting volumetric data associated with the liquid dispensing container based on the at least one sensor being actuated.

Aspect 47 includes the inventory tracking device of any preceding aspect, wherein the operations further comprise determining an amount of liquid that has been dispensed from a liquid dispensing container based on the at least one sensor being actuated and transmitting the amount to a customer computing device.

Aspect 48 includes the inventory tracking device of any preceding aspect, further comprising receiving computer readable instructions from a customer computing device and applying the computer readable instructions.

Aspect 49 includes the inventory tracking device of any preceding aspect, further comprising sending the volumetric data to a customer computing device.

Aspect 50 includes the inventory tracking device of any preceding aspect, wherein the customer computing device is a hub in communication with a centralized server.

Aspect 51 includes the inventory tracking device of any preceding aspect, wherein the hub is configured to issue purchase orders based on the volumetric data.

Aspect 52 includes the inventory tracking device of any preceding aspect, wherein the at least one sensor is a magnetic sensor configured to detect a change in magnetic flux due to passing of the ball bearing proximate the magnetic sensor.

Aspect 53 includes the inventory tracking device of any preceding aspect, wherein the at least one sensor is a proximity sensor configured to detect a proximity of the ball bearing to the at least one sensor.

Aspect 54 includes the inventory tracking device of any preceding aspect, wherein the at least one sensor is an optical sensor configured to detect a passing of the ball bearing in front of the optical sensor.

Aspect 55 includes the inventory tracking device of any preceding aspect, wherein the at least one sensor is a capacitive sensor.

Aspect 56 includes the inventory tracking device of any preceding aspect, wherein determining that the at least one sensor has been actuated comprises sensing a motion of the ball bearing during rotation of the liquid dispensing container.

Aspect 57 includes the inventory tracking device of any preceding aspect, wherein determining the amount of liquid dispensed comprises determining a length of travel of the ball bearing within the ball chamber.

Aspect 58 includes the inventory tracking device of any preceding aspect, wherein determining the amount of liquid dispensed comprises determining if the ball chamber is evacuated.

Aspect 59 includes the inventory tracking device of any preceding aspect, wherein the volumetric data comprises an initial amount of liquid in the liquid dispensing container and a total amount of dispensed liquid from the liquid dispensing container.

Aspect 60 includes the inventory tracking device of any preceding aspect, wherein the inventory tracking device is in operative communication with a hub device over a first network, and wherein the hub device is in operative communication with a centralized server over a second network.

Aspect 61 includes the inventory tracking device of any preceding aspect, and a device configured to dispense a predetermined amount of liquid, comprising: a bottom cap, the bottom cap having a first opening to receive a liquid and a second opening to measurably release the received liquid; a ball chamber arranged on the bottom cap, the ball chamber having a bottom opening in fluid communication with the second opening of the bottom cap, the ball chamber having a cylindrical cavity arranged to retain a ball bearing and the predetermined amount of liquid, the cylindrical cavity being in fluid communication with the bottom opening, the ball chamber further having a top opening in fluid communication with the cylindrical cavity; a sensor cavity arranged proximate the ball chamber, the sensor cavity configured to retain at least one sensor actuated by the ball bearing and sealed to prevent the liquid from entering the sensor cavity; and a pour spout arranged on the ball chamber, the pour spout being in fluid communication with the top opening of the ball chamber and configured to pour the predetermined amount of liquid.

Aspect 62 includes the inventory tracking device of any preceding aspect, wherein the first opening of the bottom cap is sized to receive the predetermined amount of the liquid.

Aspect 63 includes the inventory tracking device of any preceding aspect, wherein increasing the size of the first opening of the bottom cap decreases the predetermined amount of the liquid.

Aspect 64 includes the inventory tracking device of any preceding aspect, wherein decreasing the size of the first opening of the bottom cap increases the predetermined amount of the liquid.

Aspect 65 includes the inventory tracking device of any preceding aspect, further comprising an air vent disposed proximate the ball chamber, the air vent configured to receive air from an exterior of a liquid dispensing container and direct the received air into the interior of the liquid dispensing container.

Aspect 66 includes the inventory tracking device of any preceding aspect, further comprising a top configured to seat onto a liquid dispensing container.

Aspect 67 includes the inventory tracking device of any preceding aspect, further comprising a sensor stick disposed in the sensor cavity.

Aspect 68 includes the inventory tracking device of any preceding aspect, wherein the sensor stick comprises at least one magnetic sensor configured to detect placement of the ball bearing within the ball chamber.

Aspect 69 includes the inventory tracking device of any preceding aspect, wherein the sensor stick comprises a printed circuit board having printed circuitry thereon and being sized to be retained within the sensor cavity.

Aspect 70 includes the inventory tracking device of any preceding aspect, wherein the sensor stick further comprises at least one processor in operative communication with the printed circuitry.

Aspect 71 includes the inventory tracking device of any preceding aspect, wherein the at least one processor is configured to transmit individual inventory data to a hub device over a wireless communication protocol, and wherein the at least one processor is further configured to receive computer-readable instructions over the wireless communication protocol.

Aspect 72 includes the inventory tracking device of any preceding aspect, further comprising a top configured to seat onto a liquid dispensing container and a cover arranged on the top, the cover being sized to house circuitry and at least one antenna.

Aspect 73 includes the inventory tracking device of any preceding aspect, wherein the top and cover are formed of plastic.

Aspect 74 includes the inventory tracking device of any preceding aspect, further comprising a sealing ring arranged about the ball chamber, the sealing ring arranged to seat and seal within the neck of a liquid dispensing container.

Aspect 75 includes the inventory tracking device of any preceding aspect, wherein the sealing ring is formed of at least one of the following: rubber, cork, and plastic.

Aspect 76 includes the inventory tracking device of any preceding aspect, and a method comprising: receiving inventory data from a customer computing device, the customer computing device being in operative communication with a plurality of inventory tracking devices, each inventory tracking device of the plurality of inventory tracking devices being configured to receive and dispense a predetermined amount of liquid from a liquid dispensing container, and each of the plurality of inventory tracking devices configured to transmit individual inventory data of the associated liquid dispensing container; determining that inventory levels from the inventory data indicate a need for additional product; and assembling at least one purchase order based on determining that the inventory levels from the inventory data indicate the need for additional product.

Aspect 77 includes the inventory tracking device and/or method of any preceding aspect, further comprising requesting the inventory data from the customer computing device.

Aspect 78 includes the inventory tracking device and/or method of any preceding aspect, wherein receiving the inventory data comprises receiving the inventory data at a scheduled time.

Aspect 79 includes the inventory tracking device and/or method of any preceding aspect, wherein receiving the inventory data comprises calculating the inventory data at a hub.

Aspect 80 includes the inventory tracking device and/or method of any preceding aspect, wherein receiving the inventory data comprises receiving the inventory data based on demand for additional product.

Aspect 81 includes the inventory tracking device and/or method of any preceding aspect, further comprising determining the demand for additional product is based on activity related to pouring liquid from one or more of the plurality of inventory tracking devices.

Aspect 82 includes the inventory tracking device and/or method of any preceding aspect, further comprising: transmitting the at least one purchase order to a distributor.

Aspect 83 includes the inventory tracking device and/or method of any preceding aspect, further comprising selecting the distributor based on an available inventory for filling the purchase order.

Aspect 84 includes the inventory tracking device and/or method of any preceding aspect, wherein the at least one purchase order is a plurality of purchase orders, and the method further comprising: transmitting the plurality of purchase orders to a plurality of distributors.

Aspect 85 includes the inventory tracking device and/or method of any preceding aspect, further comprises choosing the plurality of distributors based on available inventory for filling each purchase order of the plurality of purchase orders.

Aspect 86 includes the inventory tracking device and/or method of any preceding aspect, further comprising determining if the customer has agreed to share inventory data with third parties.

Aspect 87 includes the inventory tracking device and/or method of any preceding aspect, wherein responsive to determining that the customer has agreed to share inventory data with third parties the method comprises: transmitting a summary of the at least one purchase order to an authorized third party.

Aspect 88 includes the inventory tracking device and/or method of any preceding aspect, wherein responsive to determining that the customer has agreed to share inventory data with third parties the method comprises: transmitting a summary of the inventory data to an authorized third party.

Aspect 89 includes the inventory tracking device and/or method of any preceding aspect, wherein each inventory tracking device of the plurality of inventory tracking devices includes a pour spout for dispensing the predetermined amount of liquid and at least one sensor for detecting the dispensing of the predetermined amount of liquid.

Aspect 90 includes the inventory tracking device and/or method of any preceding aspect, wherein each inventory tracking device of the plurality of inventory tracking devices comprises: a bottom cap, the bottom cap having a first opening to receive a liquid and a second opening to measurably release the received liquid; a ball chamber arranged on the bottom cap, the ball chamber having a bottom opening in fluid communication with the second opening of the bottom cap, the ball chamber having a cylindrical cavity arranged to retain a ball bearing and the predetermined amount of liquid, the cylindrical cavity being in fluid communication with the bottom opening, the ball chamber further having a top opening in fluid communication with the cylindrical cavity; a sensor cavity arranged proximate the ball chamber, the sensor cavity configured to retain at least one sensor actuated by the ball bearing and sealed to prevent the liquid from entering the sensor cavity; and a pour spout arranged on the ball chamber, the pour spout being in fluid communication with the top opening of the ball chamber and configured to pour the predetermined amount of liquid.

Aspect 91 includes the inventory tracking device and/or method of any preceding aspect, and a method of automated inventory control of dispensed liquids, the method comprising: receiving individual inventory data from a plurality of inventory tracking devices, each inventory tracking device of the plurality of inventory tracking devices being configured to receive and dispense a predetermined amount of liquid from a liquid dispensing container, and each of the plurality of inventory tracking devices configured to transmit individual inventory data of the associated liquid dispensing container; and assembling inventory data for all liquid dispensing containers associated with an inventory tracking device, the inventory data including a volumetric measurement of predicted liquid retained in each liquid dispensing container.

Aspect 92 includes the inventory tracking device and/or method of any preceding aspect, further comprising registering individual inventory devices to be associated with individual liquid dispensing containers.

Aspect 93 includes the inventory tracking device and/or method of any preceding aspect, wherein registering comprises assigning associated identifying data to an inventory tracking device, the identifying data identifying a particular type of liquid dispensing container associated with the inventory tracking device.

Aspect 94 includes the inventory tracking device and/or method of any preceding aspect, further comprising transmitting the assembled inventory data to a centralized server.

Aspect 95 includes the inventory tracking device and/or method of any preceding aspect, further comprising transmitting the assembled inventory data to a mobile device.

Aspect 96 includes the inventory tracking device and/or method of any preceding aspect, further comprising transmitting the assembled inventory data to a consumer computing apparatus, the consumer computing apparatus configured to display a graphical user interface with a graphical representation of at least a portion of the assembled inventory data.

Aspect 76 includes the inventory tracking device and/or method of any preceding aspect, further comprising determining a need to collect inventory data.

Aspect 98 includes the inventory tracking device and/or method of any preceding aspect, further comprising receiving updated individual inventory data based on the determined need.

Aspect 99 includes the inventory tracking device and/or method of any preceding aspect, further comprising receiving individual inventory data from inventory tracking devices that are active.

Aspect 100 includes the inventory tracking device and/or method of any preceding aspect, further comprising determining a need to update software on at least one inventory tracking device.

Aspect 101 includes the inventory tracking device and/or method of any preceding aspect, further comprising pushing computer readable instructions to the at least one inventory tracking device based on the determined need.

Aspect 102 includes the inventory tracking device and/or method of any preceding aspect, further comprising receiving the computer readable instructions from a centralized server.

Aspect 103 includes the inventory tracking device and/or method of any preceding aspect, further comprising determining that an unregistered inventory tracking device is within range of detection.

Aspect 104 includes the inventory tracking device and/or method of any preceding aspect, further comprising registering the unregistered inventory tracking device.

Aspect 105 includes the inventory tracking device and/or method of any preceding aspect, wherein each inventory tracking device of the plurality of inventory tracking devices comprises: a bottom cap, the bottom cap having a first opening to receive a liquid and a second opening to measurably release the received liquid; a ball chamber arranged on the bottom cap, the ball chamber having a bottom opening in fluid communication with the second opening of the bottom cap, the ball chamber having a cylindrical cavity arranged to retain a ball bearing and the predetermined amount of liquid, the cylindrical cavity being in fluid communication with the bottom opening, the ball chamber further having a top opening in fluid communication with the cylindrical cavity; a sensor cavity arranged proximate the ball chamber, the sensor cavity configured to retain at least one sensor actuated by the ball bearing and sealed to prevent the liquid from entering the sensor cavity; and a pour spout arranged on the ball chamber, the pour spout being in fluid communication with the top opening of the ball chamber and configured to pour the predetermined amount of liquid.

Aspect 106 includes the inventory tracking device and/or method of any preceding aspect, and an inventory tracking device, comprising: a bottom cap, the bottom cap having a first opening to receive a liquid and a second opening to measurably release the received liquid; a ball chamber arranged on the bottom cap, the ball chamber having a bottom opening in fluid communication with the second opening of the bottom cap, the ball chamber having a cylindrical cavity arranged to retain a ball bearing and the predetermined amount of liquid, the cylindrical cavity being in fluid communication with the bottom opening, the ball chamber further having a top opening in fluid communication with the cylindrical cavity; a sensor cavity arranged proximate the ball chamber, the sensor cavity configured to retain at least one sensor actuated by the ball bearing and sealed to prevent the liquid from entering the sensor cavity; and a printed circuit board disposed within the sensor cavity, the printed circuit board having the at least one sensor and a processor configured to perform operations, the operations comprising: determining that the at least one sensor has been actuated in response to movement of a liquid dispensing container; and transmitting volumetric data associated with the liquid dispensing container based on the at least one sensor being actuated.

Aspect 107 includes the inventory tracking device and/or method of any preceding aspect, wherein the operations further comprise determining an amount of liquid that has been dispensed from a liquid dispensing container based on the at least one sensor being actuated and transmitting the amount to a customer computing device.

Aspect 108 includes the inventory tracking device and/or method of any preceding aspect, further comprising receiving computer readable instructions from a customer computing device and applying the computer readable instructions.

Aspect 109 includes the inventory tracking device and/or method of any preceding aspect, further comprising sending the volumetric data to a customer computing device.

Aspect 110 includes the inventory tracking device and/or method of any preceding aspect, wherein the customer computing device is a hub in communication with a centralized server.

Aspect 111 includes the inventory tracking device and/or method of any preceding aspect, wherein the hub is configured to issue purchase orders based on the volumetric data.

Aspect 112 includes the inventory tracking device and/or method of any preceding aspect, wherein the at least one sensor is a magnetic sensor configured to detect a change in magnetic flux due to passing of the ball bearing proximate the magnetic sensor.

Aspect 113 includes the inventory tracking device and/or method of any preceding aspect, wherein the at least one sensor is a proximity sensor configured to detect a proximity of the ball bearing to the at least one sensor.

Aspect 114 includes the inventory tracking device and/or method of any preceding aspect, wherein the at least one sensor is an optical sensor configured to detect a passing of the ball bearing in front of the optical sensor.

Aspect 115 includes the inventory tracking device and/or method of any preceding aspect, wherein the at least one sensor is a capacitive sensor.

Aspect 116 includes the inventory tracking device and/or method of any preceding aspect, wherein determining that the at least one sensor has been actuated comprises sensing a motion of the ball bearing during rotation of the liquid dispensing container.

Aspect 117 includes the inventory tracking device and/or method of any preceding aspect, wherein determining the amount of liquid dispensed comprises determining a length of travel of the ball bearing within the ball chamber.

Aspect 118 includes the inventory tracking device and/or method of any preceding aspect, wherein determining the amount of liquid dispensed comprises determining if the ball chamber is evacuated.

Aspect 119 includes the inventory tracking device and/or method of any preceding aspect, wherein the volumetric data comprises an initial amount of liquid in the liquid dispensing container and a total amount of dispensed liquid from the liquid dispensing container.

Aspect 120 includes the inventory tracking device and/or method of any preceding aspect, wherein the inventory tracking device is in operative communication with a hub device over a first network, and wherein the hub device is in operative communication with a centralized server over a second network.

VI. Claims

While the specification includes examples, the disclosure's scope is indicated by the following claims. Furthermore, while the specification has been described in language specific to structural features and/or methodological acts, the claims are not limited to the features or acts described above. Rather, the specific features and acts described above are disclosed as example for embodiments of the disclosure.

Insofar as the description above and the accompanying drawing disclose any additional subject matter that is not within the scope of the claims below, the disclosures are not dedicated to the public and the right to file one or more applications to claims such additional disclosures is reserved.

The following is claimed:

1. A system for on-premise automated inventory control of liquid dispensing containers, the system comprising:
at least one inventory tracking device; and
a processing unit coupled to a memory storage, the processing unit being operative to perform the following:
associate the at least one inventory tracking device with at least one liquid dispensing container, the at least one inventory tracking device comprising one or more sensors arranged along a length of a ball chamber retaining a ball bearing, wherein at least one of the one or more sensors are capable of being actuated by translation of the ball bearing along an entire length of the ball chamber, wherein the ball chamber is in fluid communication with the liquid dispensing container,
receive individual inventory data from the at least one inventory tracking device, the at least one inventory tracking device in operative communication with the processing unit over a first network,
assemble the individual inventory data into aggregated inventory data,
process the aggregated inventory data into the following:
parsed inventory data configured to be transmitted to a centralized server, and
local inventory data configured to be stored in the memory storage,
transmit the local inventory data in the memory storage, connect to the centralized server over a second network,
receive a request to transmit the parsed inventory data, and transmit, based on the request, the parsed inventory data to the centralized server.

2. The system of claim 1, further comprising a Graphical User Interface (GUI) in operative communication with the memory storage and the processing unit, wherein the aggregated inventory data is accessible to a user via the (GUI).

3. The system of claim 2, wherein the user, via the GUI, is enabled to determine the processing of the aggregated inventory data.

4. The system of claim 1, wherein the first network is configured as a localized network.

5. The system of claim 1, wherein the processing unit is further configured to calculate an amount of liquid left in the at least one liquid dispensing container via summing the total volume poured through the one or more inventory tracking devices.

6. The system of claim 1, wherein associating the at least one inventory tracking device with the at least one liquid dispensing container comprises:
  determining that an identifying device, having a unique product identifier affixed to one of the at least one liquid dispensing container, is within a pre-configured proximity to the at least one inventory tracking device, and
  responsive to the identifying device being within the predetermined proximity to the at least one inventory tracking device, assigning associated identifying data of the at least one liquid dispensing container to the at least one inventory tracking device,
  wherein the associated identifying data identifies a particular type of liquid dispensing container associated with the at least one inventory tracking device.

7. The system of claim 1, wherein the processing unit is further configured to receive, via the second network, at least one of the following:
  a system firmware update,
  a system software update,
  an inventory tracking device firmware update, and
  an inventory tracking device software update.

8. The system of claim 7, wherein the processing unit is further configured to transmit, via the first network, to the at least one inventory tracking device, at least one of the following:
  the inventory tracking device firmware update, and
  the inventory tracking device software update.

9. The system of claim 1, wherein the request to transmit the parsed inventory data is based on at least one of the following:
  a predetermined demand threshold being met, and
  a predetermined schedule.

10. The system of claim 1, wherein the processing unit is further configured to transmit a request to transmit the parsed inventory data, the transmitting based on at least one of the following:
  a predetermined amount of liquid poured from at least one liquid pouring device,
  a predetermined change in inventory of liquid dispensing containers,
  an activity occurring at a geolocation of the system, and
  an amount of sales related to the at least one liquid pouring device.

11. The system of claim 1, wherein the one or more sensors are configured to generate volumetric data via determining a distance traveled by the ball bearing within the ball chamber.

12. The system of claim 1, wherein the processing unit is further configured to determine that inventory levels from the inventory data indicate a need for additional product.

13. The system of claim 12, wherein the processing unit is further configured to assemble at least one purchase order based on determining that the inventory levels from the inventory data indicate the need for additional product.

14. The system of claim 1, wherein the system is configured to transmit at least one purchase order, via the second network, based on the aggregated inventory data.

15. A system for on-premise automated inventory control of liquid dispensing containers, the system comprising:
  at least one inventory tracking device; and
  a processing unit coupled to a memory storage, the processing unit being operative to perform the following:
    connect to the at least one inventory tracking device over a first network, wherein the at least one inventory tracking device is configured to be in operative communication with the processing unit over the first network,
    assign the at least one inventory tracking device with at least one liquid dispensing container, wherein the at least one inventory tracking device is configured to:
      receive a flow of liquid through a chamber in fluid communication with the liquid dispensing container and arranged in proximity to a sensing device,
      dispense the liquid from a corresponding liquid dispensing container, wherein the sensing device is configured to:
        actuate in response to an indication of the liquid flow along an entire length of the chamber, and
        actuate in response to an indication of the liquid flow along a portion of the entire length of the chamber,
    receive individual inventory data from the at least one inventory tracking device,
    assemble the individual inventory data into aggregated inventory data,
    process the aggregated inventory data into the following:
      parsed inventory data configured to be transmitted to a centralized server, and
      local inventory data configured to be stored in the memory storage,
    transmit the local inventory data in the memory storage,
    connect to the centralized server over a second network,
    receive a request to transmit the parsed inventory data, and
    transmit, based on the request, the parsed inventory data to the centralized server.

16. The system of claim 15, wherein each of the at least one inventory tracking device comprises a pour spout for dispensing a predetermined amount of liquid and at least one sensor for detecting the dispensing of the predetermined amount of liquid.

17. The system of claim 15, wherein each of the at least one inventory tracking device is further configured to generate volumetric data, based on the sensing device's actuation in response to the indication of the liquid flow along at least one of the following: the entire length of the chamber and the portion of the entire length of the chamber, the volumetric data configured to be converted into individual inventory data.

18. The system of claim 17, wherein the individual inventory data is parsed volumetric data.

19. The system of claim 15, wherein the first network is configured as a localized network.

20. A system for on-premise automated inventory control of liquid dispensing containers, the system comprising:
- at least one inventory tracking device; and
- a processing unit coupled to a memory storage, the processing unit being operative to perform the following:
  - associate the at least one inventory tracking device with at least one liquid dispensing container, wherein associating the at least one inventory tracking device with the at least one liquid dispensing container comprises:
    - determining an identifying device, having a unique product identifier affixed to one of the at least one liquid dispensing container, is within a predetermined proximity to one of the at least one inventory tracking device, and
    - responsive to the identifying device being within the predetermined proximity to the one of the at least one inventory tracking device, assigning associated identifying data of the at least one liquid dispensing container to the at least one inventory tracking device,
  - wherein the at least one inventory tracking device is configured to:
    - receive a flow of liquid through a chamber in fluid communication with the at least one liquid dispensing container, and
    - dispense the liquid from the at least one liquid dispensing container, wherein the sensing device is configured to:
      - actuate in response to an indication of the liquid flow along an entire length of the chamber, and
      - actuate in response to an indication of the liquid flow along a portion of the entire length of the chamber,
  - receive individual inventory data from the at least one inventory tracking device, the at least one inventory tracking device in operative communication with the processing unit over a first network,
  - assemble the individual inventory data into aggregated inventory data,
  - process the aggregated inventory data into the following:
    - parsed inventory data configured to be transmitted to a centralized server, and
    - local inventory data configured to be stored in the memory storage,
  - transmit the local inventory data in the memory storage,
  - connect to the centralized server over a second network,
  - receive a request to transmit the parsed inventory data, and
  - transmit, based on the request, the parsed inventory data to the centralized server.

* * * * *